(12) United States Patent
Kobayashi

(10) Patent No.: US 9,608,990 B2
(45) Date of Patent: Mar. 28, 2017

(54) AUTHORITY MANAGEMENT SERVER AND AUTHORITY MANAGEMENT METHOD

(71) Applicant: CANON KABUSHIKI KAISHA, Tokyo (JP)

(72) Inventor: Makoto Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/560,360

(22) Filed: Dec. 4, 2014

(65) Prior Publication Data

US 2015/0180863 A1 Jun. 25, 2015

(30) Foreign Application Priority Data

Dec. 25, 2013 (JP) ................................. 2013-268093

(51) Int. Cl.
*H04L 29/06* (2006.01)
*H04L 12/911* (2013.01)

(52) U.S. Cl.
CPC .......... *H04L 63/0853* (2013.01); *H04L 47/70* (2013.01); *H04L 63/0807* (2013.01)

(58) Field of Classification Search
CPC ......... H04L 47/70; H04L 63/10; H04L 63/08; H04L 63/0807; H04L 63/0853
USPC .......................................................... 726/9
See application file for complete search history.

(56) References Cited

U.S. PATENT DOCUMENTS

| 2003/0005135 A1* | 1/2003 | Inoue ..................... G06F 21/10 709/229 |
| 2007/0118849 A1* | 5/2007 | Kisel ................. H04L 29/06027 725/25 |
| 2012/0110646 A1* | 5/2012 | Ajitomi ................. G06F 21/335 726/4 |

FOREIGN PATENT DOCUMENTS

JP 2007-328417 A 12/2007

OTHER PUBLICATIONS

D. Hardt, "The OAuth 2.0 Authorization Framework", retrieved May 2013 from http://tools.ietf.org/html/rfc6749, pp. 1-18 (Oct. 2012).

* cited by examiner

*Primary Examiner* — Yogesh Paliwal
(74) *Attorney, Agent, or Firm* — Carter, DeLuca, Farrell & Schmidt, LLP

(57) ABSTRACT

An API counting process that sets a limit number for an API used by a client, and when an access token is issued in response to a request from an authority delegation destination and a request to verify the issued access token is received, manages an API usage limit number on a client-by-client basis in accordance with the usage limit number for each API set for the authority delegation destination, is executed. The API usage number is incremented (S5.2), compared with the usage limit number (S5.3), and the access token verification is considered to have failed in the case where the limit has been exceeded.

11 Claims, 20 Drawing Sheets

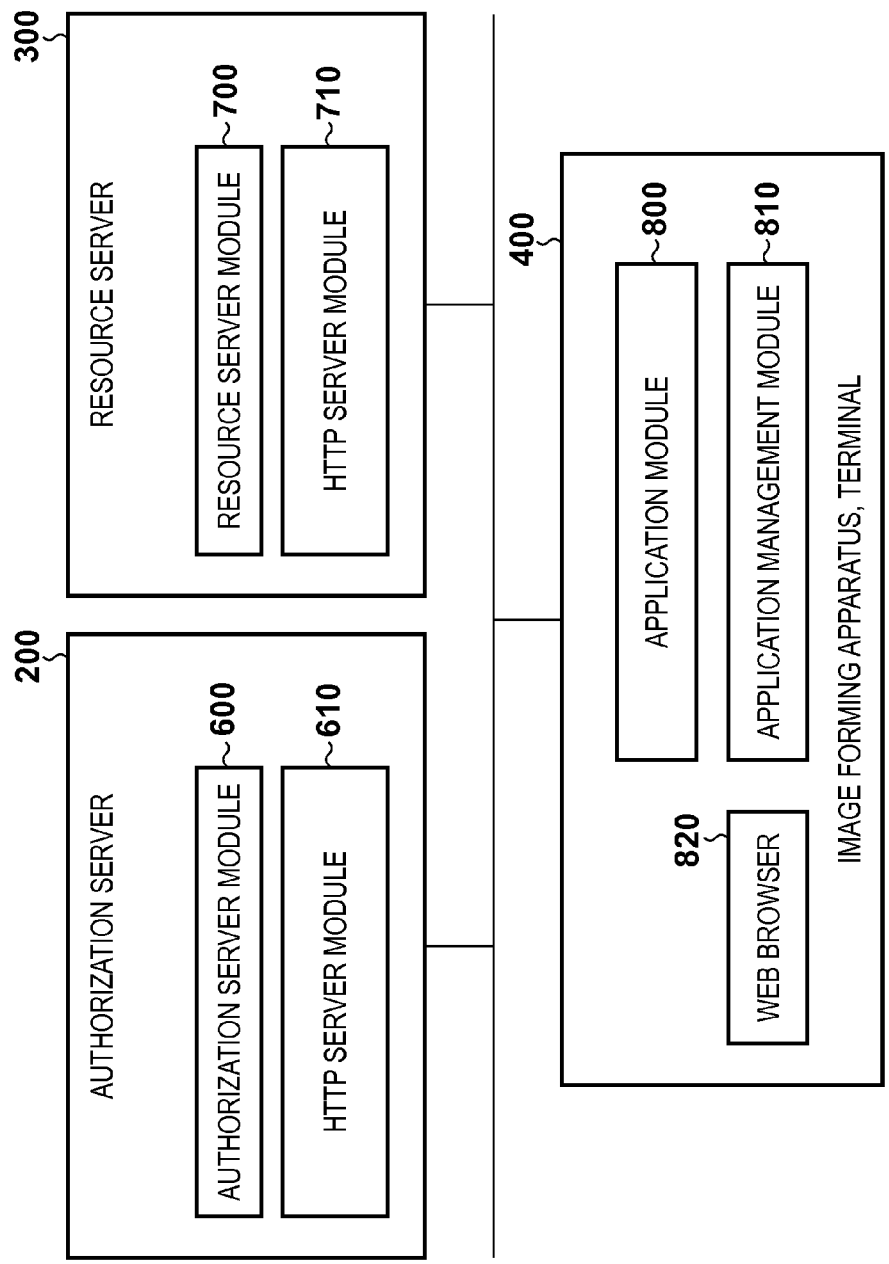

FIG. 4A

CREDENTIAL MANAGEMENT TABLE 1200

| SERIAL NUMBER 1201 | ISSUER 1202 | OWNER 1203 | START DATE 1204 | END DATE 1205 | TENANT MASTER DN 1206 |
|---|---|---|---|---|---|
| 00abcdef0000000000001 | AA Root CA01 | Client 00001 Master | 2013/05/30 | 2015/05/30 | CN=master00001, OU=100001A |
| 00abcdef0000000000002 | AA Root CA01 | Client 00002 Master | 2013/05/30 | 2015/05/30 | CN=master00003, OU=10002AA |
| 00abcdef0000000000003 | AA Root CA01 | Client 00003 Master | 2013/05/30 | 2036/05/30 | CN=master00003, OU=10003AA |
| | | | | | |

FIG. 4B

CLIENT MANAGEMENT TABLE 1300

| CLIENT ID 1301 | SECRET 1302 | TENANT ID 1303 | TYPE 1304 | DN 1305 | CLIENT NAME 1306 | REDIRECT URL 1307 |
|---|---|---|---|---|---|---|
| master00001@10001AA | ********** | 10001AA | MASTER | CN=master00001, OU=10001AA | | |
| master00003@10002AA | ********** | 10002AA | MASTER | CN=master000002, OU=10002AA | | |
| master00003@10003AA | ********** | 10003AA | MASTER | CN=master000003, OU=10003AA | | |
| 01d7e3139d4e4e628203e179e1401de2@10001AA | ********** | 10001AA | GENERAL | CN=01d7e3139d4e4e628203e179e1401de2, OU=10001AA | INTERNAL APP | |
| 053753a390d3e4e648213f17eb1331a31@10002AA | ********** | 10002AA | GENERAL | CN=053753a390d3e4e648213f17eb1331a31, OU=10002AA | PRINTING APP | https://intranet/redirect |
| 543ae4f3998be4eb7ed92ea99e43f2ae@10003AA | ********** | 10003AA | GENERAL | CN=543ae4f3998be4eb7ed92ea99e43f2ae, OU=10003AA | PRINTING APP | https://paidapplication/redirect |
| 79c8c08587d34eb9b07f10bcd603cc5b1@10001AA | ********** | 10001AA | GENERAL | CN=79c8c08587d34eb9b07f10bcd603cc5b1, OU=10001AA | DATA SET CREATION APP | https://freeapplication/redirect |
| 2ea7129637594a728459fefc3c3d4537@10001AA | ********** | 10001AA | GENERAL | CN=2ea7129637594a728459fefc3c3d4537, OU=10001AA | FORM CREATION APP | https://paidapplication/redirect |
| f5d44ea39477480dabbb41396b12e120f@10001AA | ********** | 10001AA | GENERAL | CN=f5d44ea39477480dabbb41396b12e120f, OU=10001AA | PRINTING APP | https://paidapplication/redirect |
| 03d40cb78200d4829983c241098004af6@10001AA | ********** | 10001AA | GENERAL | CN=03d40cb78200d4829983c241098004af6, OU=10001AA | FORM CREATION /PRINTING APP | https://paidapplication/redirect |

F I G. 4C

1400

DEFAULT AUTHORITY MANAGEMENT TABLE

| TENANT ID (1401) | DEFAULT AUTHORITY ID (1402) |
|---|---|
| 10001AA | USER PROVISIONING |
| 10002AA | PAID DATA CONVERSION |
| 10001AA | PAID DATA SET CREATION |
| 10001AA | PAID FORM CREATION |
| 10001AA | PAID PRINTING |
| 10001AA | PAID FORM CREATION/PRINTING |

F I G. 4D

1500

CLIENT AUTHORITY TABLE

| CLIENT ID (1501) | AUTHORITY ID (1502) |
|---|---|
| 01d7e3139d4e4e628203e179e1401de2@10001AA | USER PROVISIONING |
| 053753a39d3e4e648213f17eb1331a31@10002AA | PAID DATA CONVERSION |
| 79c8c08587d34eb9b0710bcd603cc6b1@10001AA | PAID DATA SET CREATION |
| 2ea7129637594a728459fefc3c3d4537@10001AA | PAID FORM CREATION |
| f5d44ea3947f48dabbb41396b12e120f@10001AA | PAID PRINTING |
| 03d40cb7820d4829983c241098004af6@10001AA | PAID FORM CREATION/PRINTING |
| | |

FIG. 5A

SCOPE TABLE (1600)

| SCOPE ID (1601) | TYPE (1602) | DESCRIPTION (1603) | AUTHORITY ID (1604) |
|---|---|---|---|
| DataSetService | single | – | DATA CREATION |
| FormService | single | – | FORM |
| PrintService | single | – | PRINTING |
| DataSetFormPrintService | group | – | DATA CREATION, FORM, PRINTING |

FIG. 5B

USER MANAGEMENT TABLE (1700)

| USER ID (1701) | PASSWORD (1702) | TENANT ID (1703) |
|---|---|---|
| user001@user.com | ********** | 1001AA |
| | | |

FIG. 5C

USER AUTHORITY TABLE (1800)

| USER ID (1801) | AUTHORITY ID (1802) |
|---|---|
| user001@user.com | TENANT MANAGER |
| | |

FIG. 5D

ACCESS TOKEN MANAGEMENT TABLE 1900

| ACCESS TOKEN ID 1901 | TOKEN TYPE 1902 | EXPIRATION DATE 1903 | SCOPE ID 1904 | CLIENT ID 1905 | OWNER ID 1906 |
|---|---|---|---|---|---|
| AT_0000001 | ACCESS TOKEN | 2013/10/30 24:00:00 | DataSetService | 79c8c08587d34eb9b0710bcd603cc6b1@10001AA | |
| AT_0000002 | ACCESS TOKEN | 2013/10/30 24:00:00 | FormService | 2ea7129637594a728459fefc3c3d4537@10001AA | |
| AT_0000003 | ACCESS TOKEN | 2013/10/30 24:00:00 | PrintService | f5d44ea3947f48dabbb41396b12e120f@10001AA | |
| AT_0000004 | ACCESS TOKEN | 2013/10/30 24:00:00 | [DataSetService, FormService, PrintService] | 03d40cb7820d4829983c241098004af6@10001AA | |

F I G.  5E

API USAGE NUMBER MANAGEMENT TABLE 1950

| TENANT ID 1951 | SCOPE ID 1952 | SERVICE NAME 1953 | API USAGE LIMIT NUMBER 1954 | API USAGE NUMBER 1955 | API ID List 1956 |
|---|---|---|---|---|---|
| 1001AA | DataSetService | DATA SET SERVICE | 10000 | 300 | [createDataSet] |
| 1001AA | FormService | FORM SERVICE | 10000 | 238 | [createForm] |
| 1001AA | PrintService | PRINTING SERVICE | 10000 | 238 | [printForm] |
| 1001AA | DataSetFormPrintService | FORM CREATION/PRINTING SERVICE | 10000 | 692 | [createDataSet, createForm, printForm] |
|  |  |  |  |  |  |

FIG. 5F

SCOPE GROUP API MANAGEMENT TABLE 1980

| TENANT ID 1981 | SCOPE ID 1982 | GROUP EXECUTION NUMBER 1983 | API USAGE NUMBER 1984 |
|---|---|---|---|
| 1001AA | DataSetFormPrintService | 3 | 1 |

FIG. 5G

SCOPE GROUP TABLE 1990

| SCOPE GROUP ID 1991 | SCOPE ID LIST 1992 | DESCRIPTION 1993 |
|---|---|---|
| DataSetFormPrintService | [DataSetService, FormService, PrintService] | – |

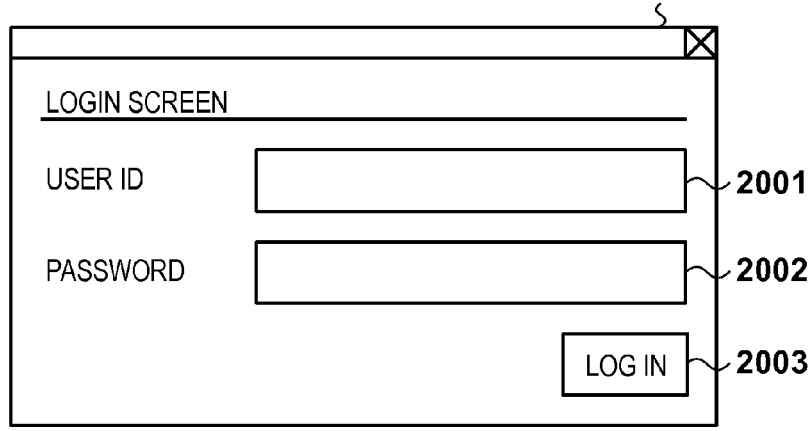
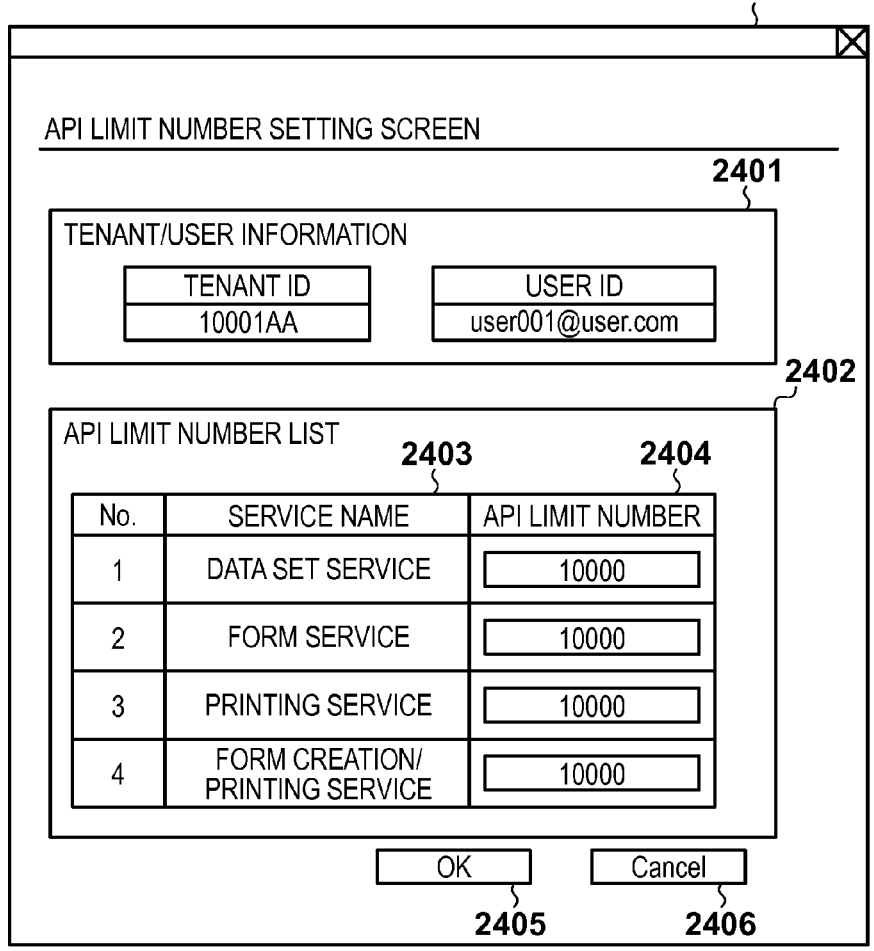

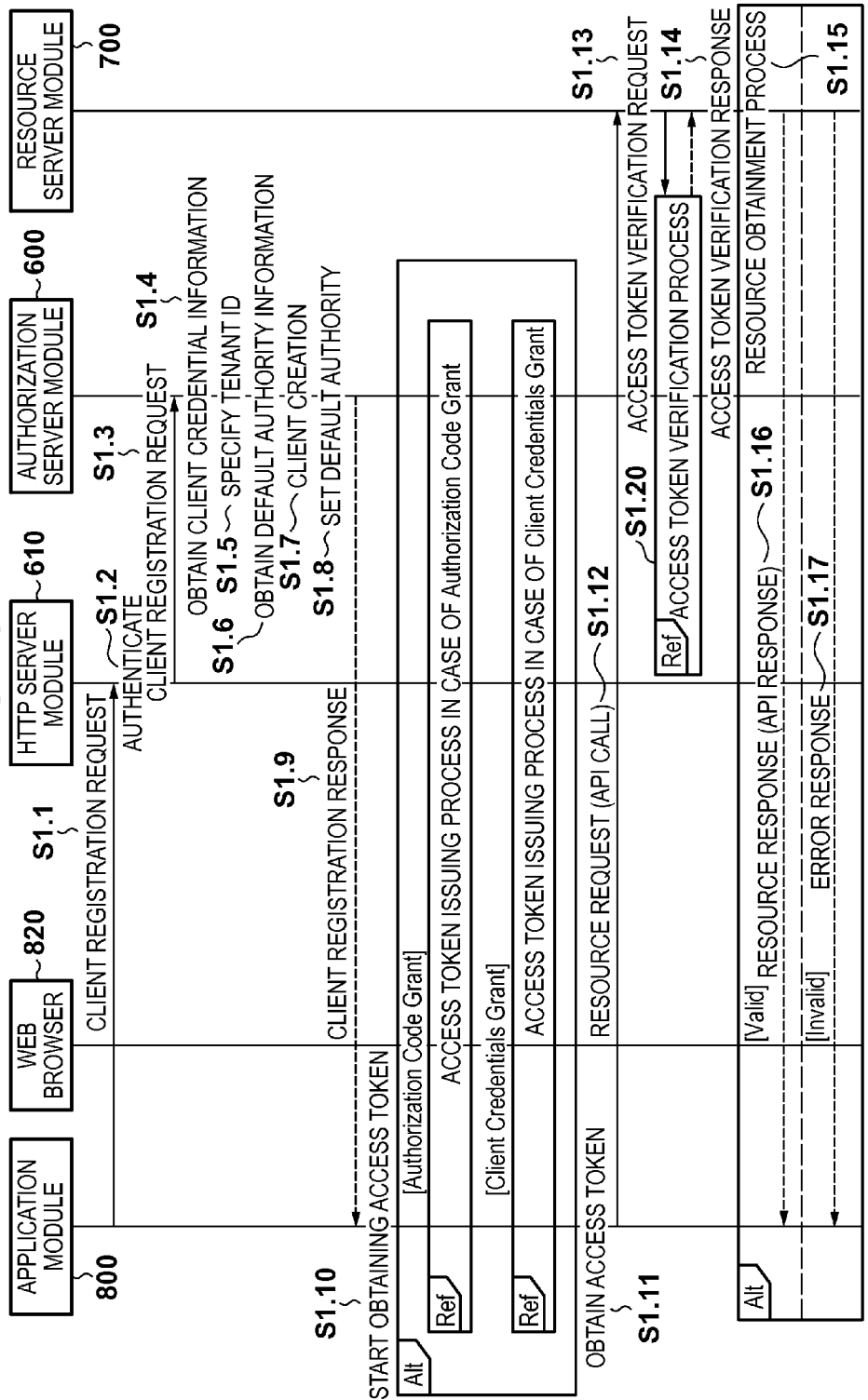

AUTHORITY MANAGEMENT SERVER AND AUTHORITY MANAGEMENT METHOD

BACKGROUND OF THE INVENTION

Field of the Invention

The present invention relates to methods for managing API call limits for a client in an authorization delegation system, and particularly relates to authority management servers and authority management methods regarding API calls from multiple clients in the same tenant.

Description of the Related Art

Recent years have seen an increase in the use of what are known as cloud-based services implemented over the Internet. It is becoming more and more common for businesses as well as individuals to manage customer relationships using a CRM (Customer Relationship Management) service, distribute and collect information in real time using an SNS (Social Networking Service), and so on, for example. Many of these cloud-based services publicize individual web service APIs, and it is now possible to use functions provided by such services from other applications, cloud-based services, and so on via the APIs. As a result, there is a continued increase in mashup functions in which multiple APIs publicized by multiple cloud-based services are combined in order to configure a service that operates as if it were a single web service.

However, the increase in opportunities to use mashup functions by which multiple cloud-based services cooperate has also given rise to several problems. For example, there is a risk that more information than a user intends to share will be exchanged among the multiple cloud-based services, heightening the risk of user data, personal information, and the like being leaked. It is generally preferable not to collect more user data, personal information, and so on than is required for each cloud-based service, and it is further necessary to prevent the user data, personal information, and so on from being provided to cloud-based services that the user does not wish to cooperate. Meanwhile, from the perspective of service providers, it is preferable to make it easier to realize a system for cooperation of cloud-based services. In light of such circumstances, a standard protocol for cooperation of authorizations, called OAuth 2.0, has been developed (see "The OAuth 2.0 Authorization Framework," (online), D. Hardt, May 2013, retrieved from http://tools.ietf.org/html/rfc6749).

According to OAuth 2.0, when, for example, there is an API that acquires the data of a user managed by a service A, a service B that is authorized by that user can access the stated API. At this time, a range that will be accessed by the service B is made clear, whereupon the service A obtains explicit authorization from the user for the service B to access the API. The user carrying out this explicit authorization is referred to as an authorization operation.

When the user carries out the authorization operation, the service B receives a token authorizing access from the service A (called an "access token" hereinafter), and the service B can subsequently access the service A's API by using that access token. The process by which the user's authorization operation allows a service to access user resources managed by a different service is referred to as the delegation of authorizations. When the access token is used, the service B can access the service A's API under the authority of the user who made the authorization, without needing that user's credentials. As such, the service B that has been authorized by the user and that has obtained the access token has an obligation to manage the access token properly and with care.

According to OAuth 2.0, it is necessary for the service B to be authenticated in order to prevent spoofing of the service B. To authenticate the service B, it is necessary for the service A to issue the service B's credentials in advance, and specifically a client ID and a secret, manage the credentials, and furthermore set those credentials in the service B. Hereinafter, the service A that provides a resource will be referred to as a "resource server", whereas from the perspective of the service A, the service B, or in other words, the other service that uses the resource server under the authority delegated by the user of that service, will be referred to as a "client" (of that resource server). According to OAuth 2.0, it is possible to separately configure an authorization server that carries out the aforementioned user authorization operations, the issuing of access tokens, and the authentication of clients, and a resource server that manages user data as resources and publicizes APIs as web services. In such a case, the service B accepts the delegation of authority from the user, obtains the access token from the authorization server, and uses that access token to access the API of the resource server. The resource server is configured to request the authorization server to verify the obtained access token, grant access to the resource only in the case where the access has been authorized, and then return data to the service B.

Typically, in a cloud-based service, an API publicized by a web service monitors a number of uses per unit of time for each client (see Japanese Patent Laid-Open No. 2007-328417, for example). This is done in order to prevent a drop in the overall quality of the service resulting from the API being used excessively by a specific client. In particular, paid services that charge based on the amount the service is used often provide limits on the number of times the service can be used in a unit of time and reject access after the limit has been reached. This is because a paid service is basically made usable under a contract with a user, and the operator of a paid service has an obligation to provide the service in a stable manner in accordance with the details of that contract. An SLA (Service Level Agreement) is known as an example of such a system for ensuring the quality of a service. An SLA defines such items as a minimum speed of the service being provided, a limit on the amount of time for which the service can be used, and so on. A user then pays a fee as compensation for the service quality defined in the SLA. The SLA also defines penalties for the service provider, user guarantees such as reductions in usage fees, and so on for cases where the promised quality is not provided. As such, with a paid service, it is extremely important for the quality defined in the SLA to be maintained, which means that it is important to prevent drops in the service quality by setting limits on API usage amounts and rejecting access when the limits have been reached.

The following configuration can be considered for a situation in which a company's internal system, namely multiple clients present in a tenant, cooperates with a cloud-based service. "Tenant" is a unit used to distinguish entities to which a resource is provided, and is a unit by which users use and manage the cloud. For example, in a case where multiple users utilize the same resource server, the information of the users managed by the resource server is divided into independent units, and these divided units correspond to "tenants". In other words, a configuration can be considered in which each client functions as a tenant client for a specific tenant in the cloud-based service (that is, the resource server), and multiple clients can use multiple services through the specific tenant. In this configuration, a data upload client, a form client, and a print client for a cloud-based service to which a tenant belongs are provided in that tenant, for example. It is assumed that the API usage limit management is implemented as limit management through OAuth, on a tenant-by-tenant basis.

However, the aforementioned OAuth configuration, or in other words, a configuration including the authorization server that issues access tokens and the resource server that publicizes the API, has the following problem. When there is an API usage limit number in a specific tenant, and a client uses the API of the service A excessively and reaches the usage limit, the API of the service B can no longer be called. In other words, the number of times an API in a given service can be used is affected by the usage situation of an API in another service.

SUMMARY OF THE INVENTION

The present invention has the following configuration.

According to one aspect of the present invention, there is provided an authority management server comprising: a management unit that manages a user's access authority for a resource; an issuing unit that, in response to an authorization request from a client requesting delegation of the user's access authority for a resource, verifies the authorization request and issuing an access token to the client in the case where the verification is successful; and a verification unit that, in the case where there is a resource request along with the access token, verifies the access token and returning a verification response in the case where the verification is successful, wherein both the authorization request verification performed by the issuing unit and the access token verification performed by the verification unit determine whether or not a number of accesses of the resource has exceeded a set access limit number, and determine the access token to be valid in the case where the access limit number is not exceeded.

According to another aspect, the present invention has the following configuration.

An authority management server comprising: a management unit that manages a user's access authority for a resource; an issuing unit that, in response to an authorization request from a client requesting delegation of the user's access authority for a resource, issues an access token to the client; and a verification unit that, in the case where there is a resource request along with the access token, verifies the access token and returning a verification response in the case where the verification is successful, wherein the access token verification performed by the verification unit determines whether or not a number of accesses of the requested resource has exceeded a set access limit number, and determines the access token to be valid in the case where the access limit number is not exceeded.

According to the present invention, in a single tenant, usage limits for APIs in individual services are not affected by the usage situation of APIs in other services. This increases the usability of the services.

In addition, in the case where multiple services operate in a cooperated manner, an API usage limit can be set for a series of functions configured of the multiple services, making it possible to execute the functions without errors and increase the usability of the services.

Further features of the present invention will become apparent from the following description of exemplary embodiments (with reference to the attached drawings).

BRIEF DESCRIPTION OF THE DRAWINGS

FIG. 3 is a diagram illustrating software modules in respective devices.

FIGS. 4A-4D are diagrams illustrating table structures related to clients managed by an authorization server.

FIGS. 5A-5G are diagrams illustrating table structures related to access tokens managed by the authorization server.

FIGS. 7A and 7B are diagrams illustrating examples of login and API limit setting screens.

FIG. 8 is a diagram illustrating a sequence from client registration to resource access.

DESCRIPTION OF THE EMBODIMENTS

Hereinafter, embodiments of the present invention will be described with reference to the drawings.

Figure 1:
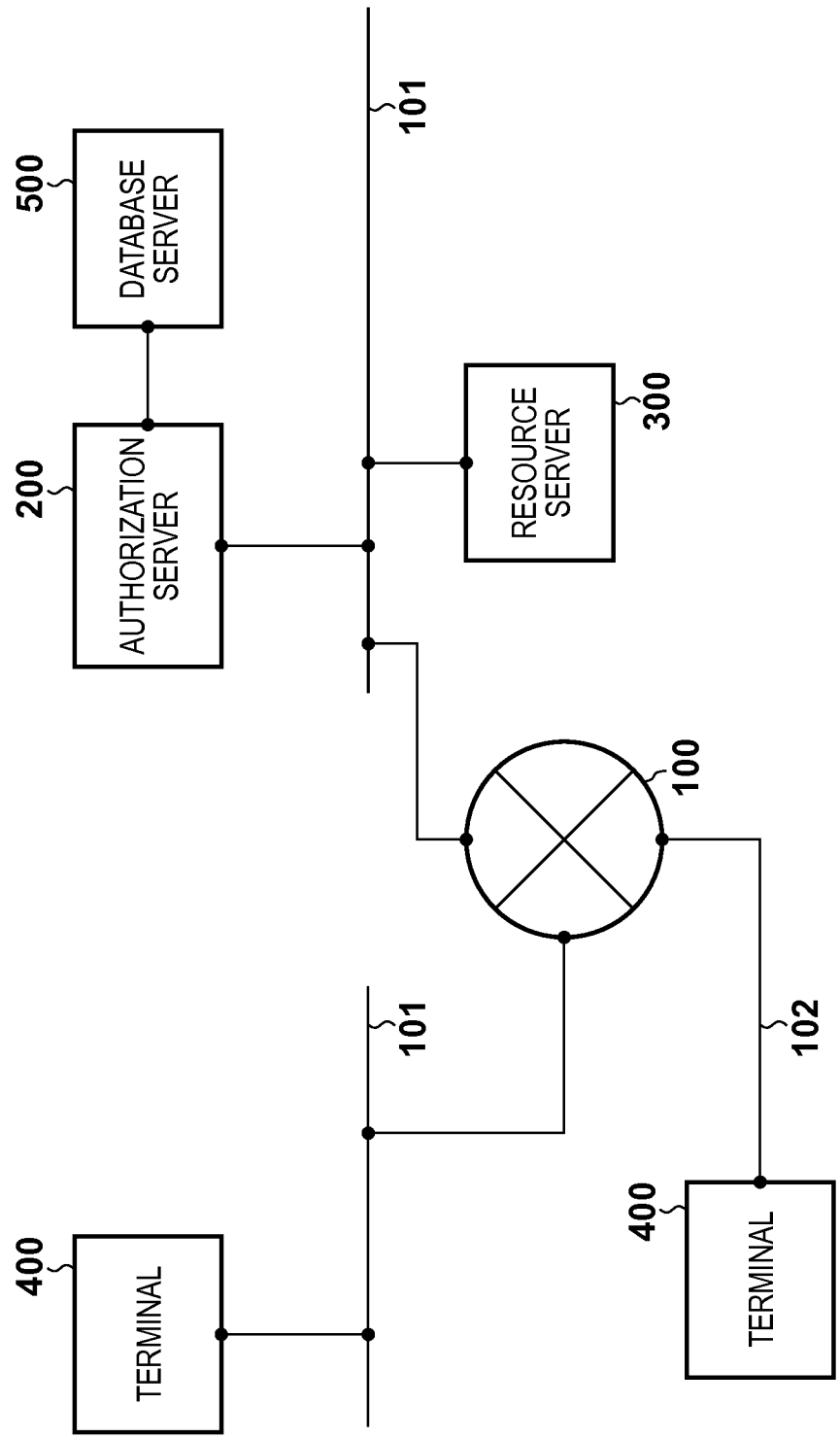
FIG. 1 is a system configuration diagram.

An authority delegation system having an API usage number limit management function according to the present embodiment is implemented over a network configured as shown in FIG. 1. Note that the authority delegation system is a system configured of servers and clients, and is a system that provides services to authorized clients. The delegated authority corresponds to the authority to access resources provided by a resource server, which will be mentioned later. Because the system is a system that provides resources, the system according to the present embodiment can also be called a resource providing system.

Configuration of Authority Delegation System

In FIG. 1, a wide area network (WAN) 100 is a network for local area networks and the like to connect to each other, and corresponds to the Internet, for example. A World Wide Web (WWW) system, for example, is configured in the WAN 100. A local area network (LAN) 101 connects network constituent elements such as computers, for example. A public line 102 is a public line that connects the WAN 100 to constituent elements such as computers, and is called an "access line" in the case where the WAN 100 is the Internet.

An authorization server 200 is a server for implementing OAuth 2.0, and is provided with an authorization server module. The authorization server is a server that manages user and client authorization to access resources, and is also called an "authority management server". A resource server 300 is provided with resource server modules such as a user provisioning service, a paid data conversion service, a free data conversion service, and so on. Note that one or more resource server modules may be provided in a single resource server. The resource server 300 stores and manages resources for each user, and provides the resources to authorized clients via service APIs. "Resource" refers to storage space, processing capabilities, or specific applications, for example. A terminal 400 is a device that executes an application program that accesses a resource provided by the resource server 300, and is, for example, a mobile terminal such as a smartphone, an image forming device, or the like. One or more application modules are installed in the terminal 400. A user communicates with the resource server using the application module. A database server 500 is connected to the authorization server 200 via the LAN 101, and stores data used by the authorization server module. The authorization server 200, the resource server 300, and the terminals 400 are connected to each other via the WAN 100 and the LAN 101. Note that the authorization server 200, the resource server 300, and the terminals 400 may be provided on separate individual LANs, or may be provided on the same LAN. In addition, the authorization server 200, the resource server 300, and the database server 500 may be configured within a single server.

Server and Terminal Configuration

Figure 2:
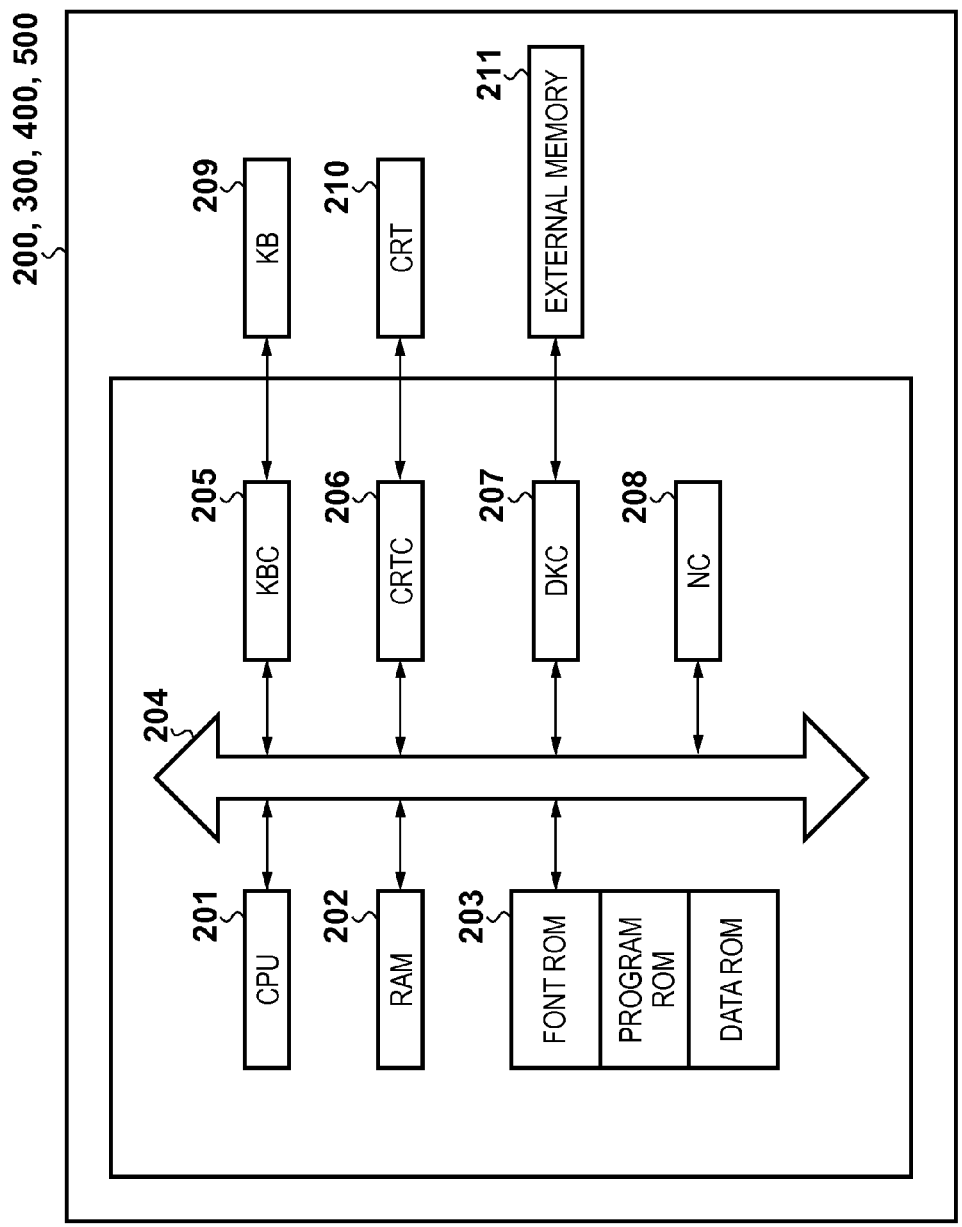
FIG. 2 is a diagram illustrating the hardware configuration of each device.

The authority delegation system according to the present embodiment is implemented as a system including servers and terminals configured as indicated in FIG. 2. FIG. 2 illustrates the hardware configuration of the authorization server 200, the resource server 300, the terminals 400, and the database server 500. Note that the hardware block diagram shown in FIG. 2 corresponds to a hardware block diagram for a typical information processing apparatus, and the hardware configuration of such a typical information processing apparatus can be applied in the servers and terminals according to the present embodiment.

In FIG. 2, a CPU 201 executes programs, such as an OS or applications, that are stored in a program ROM within a ROM 203 or loaded into a RAM 202 from an external memory 211 such as a hard disk (HD), and controls the respective blocks connected to a system bus 204. Here, "OS" is an acronym for "operating system", which runs on a computer, and the operating system will be referred to as an "OS" hereinafter. The processes of the sequences mentioned later are implemented by executing these programs. The RAM 202 functions as the main memory, a working area, and so on for the CPU 201. A keyboard controller (KBC) 205 controls key inputs from a keyboard 209, a pointing device (not shown), or the like. A CRT controller (CRTC) 206 controls displays in a CRT display 210. A disk controller (DKC) 207 controls data access in the external memory 211, such as a hard disk (HD), which stores various types of data. A network controller (NC) 208 is connected via the WAN 100, the LAN 101, or the public line 102, and executes communication control processes with the other devices.

Unless otherwise specified, the following descriptions assume that the CPU 201 is the main hardware entity that executes processes in the server, and that the application program installed in the external memory 211 is the main software entity.

Software Module Configuration

FIG. 3 is a diagram illustrating module configurations in the authorization server 200, the resource server 300, and the terminals 400 according to the present embodiment. Note that the authorization server 200, the resource server 300, and the terminals 400 are the same as those shown in FIG. 2.

In FIG. 3, the authorization server 200 includes an authorization server module 600 and an HTTP server module 610. The HTTP server module 610 is a module for carrying out, as a server, HTTP communication with an HTTP client (for example, a web browser) in the terminal 400 connected via the WAN 100. The module is configured to be capable of SSL/TLS communication, and has a certificate store (not shown). In the present embodiment, the configuration is such that, at an end point where a client registration request is received, which will be described later, a request for authentication using an X.509 certificate is issued to the origin of the stated request. The authorization server module 600 is a web application that runs on or in cooperation with the HTTP server module 610, and accepts and processes requests from and returns responses to the terminal 400 via the HTTP server module 610. The present embodiment is configured so that at this time, when a client registration request is received and the origin of the request has been successfully authenticated in the HTTP server module 610, the received certificate is communicated to the authorization server module 600.

The resource server 300 includes a resource server module 700 and an HTTP server module 710. The HTTP server module 710 has the same functions as the HTTP server module 610. The resource server module 700 is a web application that runs on or in cooperation with the HTTP server module 710, and accepts and processes requests from and returns responses to the terminal 400 via the HTTP server module 710.

The terminal 400 includes an application management module 810 and a web browser 820, and furthermore has one or more application modules 800. The application management module 810 has a function for managing the life cycle of the application module 800, running on the terminal 400, which is to be managed. "Life cycle" refers to an application state, including installation, launching, closing, and uninstalling. OSGI (registered trademark), defined by the OSGi (Open Services Gateway initiative) Alliance, can be considered as an example of the application management module 810. The application module 800 is an application that runs in an application execution environment provided by the terminal 400. The life cycle of this application is managed by the application management module 810. Here, the application module 800 may be provided in the terminal 400 in advance, or may be installed later via the application management module 810. The terminal 400 further includes the web browser 820, which is a user agent for accessing the world wide web. The application module 800 holds an X.509 certificate for identifying itself and a private key for the certificate. These can be used when establishing communication with the HTTP server module 610, which will be described later, in order for the HTTP server module 610 to authenticate that the request is from the application module.

Database Server Data Tables

FIGS. 4A, 4B, 4C, and 4D illustrate data tables stored in an external memory of the database server 500 configured to be capable of communicating with the authorization server 200 over the LAN 101. These data tables can also be configured in an external memory of the authorization server 200.

FIG. 4A illustrates a certificate management table 1200. In the present embodiment, X.509 certificates are used as the stated certificates. The certificate management table 1200 includes a certificate serial number 1201, a certificate issuer 1202, an owner 1203, a start date 1204, an end date 1205, and a distinguished name (DN) 1206 serving as an identifier for a master user of an associated tenant, which will be described later. As described in the related art section above, "tenant" is a unit used to distinguish entities to which a resource is provided, and is a unit by which users use and manage the cloud.

FIG. 4B illustrates a client management table 1300. The client management table 1300 includes a client ID 1301, a client secret 1302, a tenant ID 1303, a type 1304, a DN 1305, a client name 1306, and a redirect URL 1307. The authorization server 200 has a function for authenticating clients by verifying the authenticity of a client requesting authentication or the like by comparing a set of an ID and private information received from the client with a set of information including the client ID 1301 and the secret 1302, and generating credentials if the client is successfully authenticated. The client name 1306 and the redirect URL 1307 are values used in sequences described later. Meanwhile, the type 1304 holds data for identifying whether or not the client in that record is the master user of a tenant.

FIG. 4C illustrates a default authority management table 1400. The default authority management table 1400 includes a tenant ID 1401 and a default authority ID 1402. The tenant ID 1401 is configured so as to be referable with the tenant ID 1303 of the client management table 1300.

FIG. 4D illustrates a client authority table 1500. The client authority table 1500 includes a client ID 1501 and an authority ID 1502. The client ID 1501 is configured so as to be referable with the client ID 1301 of the client management table 1300. The authority ID 1502 holds an authority ID set for the default authority ID 1402 of the default authority management table 1400. The registration of the authority ID in the authority ID 1502 will be described later.

Authorization Server Data Tables

FIGS. 5A, 5B, 5C, 5D, and 5E illustrate data tables stored in an external memory of the database server 500 configured to be capable of communicating with the authorization server 200 over the LAN 101. These data tables can also be configured in an external memory of the authorization server 200.

FIG. 5A illustrates a scope table 1600. In an authority delegation protocol using OAuth 2.0, "scope" refers to a range of resources that can be referred to using an access token when that access token is issued. Note that the scope in the present embodiment corresponds to an access API related to a resource that can be referred to by the scope, or to a group including a series of access APIs. The scope and access API also correspond to various types of services in the present embodiment. An example of an access API defined by the scope will be described later.

The scope table 1600 includes a scope ID 1601, a scope type 1602, a scope description 1603 that is used in a screen example mentioned later, and an authority ID 1604. Here, "scope" refers to a range that can be accessed by an authority delegation destination (client) in the authority delegation flow according to OAuth, which will be mentioned later. Note that a "resource owner" referred to here differs depending on the flow in OAuth 2.0. More specifically, in the present embodiment, an access token obtainment flow according to a Client Credentials Grant is carried out. The resource owner is the client itself in the case of the access token obtainment flow according to the Client Credentials Grant. The authority ID 1604 in the scope table 1600 indicates authority required to access the scope indicated by the scope ID, and zero or more authority IDs can be associated therewith. In the case where multiple authority IDs are associated, the resources indicated by the scope can be accessed if at least one of the multiple authority IDs has the required authority. In the case where zero authority IDs are associated, or in other words, in the case where not even one authority ID is associated, any subject authenticated for that scope is capable of access. The scope type 1602 indicates whether the scope corresponds to a single API or to a series of APIs serving as a group. An API group refers to a case where an application that uses a series of APIs, such as data creation, form processing, and the printing thereof, serves as a client. Although there is no difference in the processing between when there is a single API and when there is a group of APIs in the present embodiment, the API usage limit number is handled differently in the second embodiment, which will be described later.

FIG. 5B illustrates a user management table 1700. The user management table 1700 includes a user ID 1701, a password 1702, and a tenant ID 1703. The authorization server 200 has a function for authenticating each user by verifying the authenticity of a user by comparing a user ID and a password entered by a user with a set of information including the user ID 1701 and the password 1702, and generating credentials if the user is successfully authenticated.

FIG. 5C illustrates a user authority table 1800. The user authority table 1800 includes a user ID 1801 and an authority ID 1802. The user ID 1801 is configured so as to be referable with the user ID 1701 of the user management table 1700. Although the present embodiment describes the user authority table 1800 and the client authority table 1500 as being tables independent from each other, the items therein can also be managed using a single table.

FIG. 5D illustrates an access token management table 1900. The access token management table 1900 includes an access token ID 1901, a token type 1902, an expiration date 1903, scope ID 1904, and a client ID 1905. Details of processing related to the access token management table 1900 will be given later.

FIG. 5E illustrates an API usage number management table 1950. The API usage number management table 1950 includes a tenant ID 1951, a scope ID 1952, a service name 1953, an API usage limit number 1954, an API usage number 1955, and an API ID List 1956. The tenant ID 1951 is configured so as to be referable with the tenant ID 1703 of the user management table 1700. The scope ID 1952 is configured so as to be referable with the scope ID 1601 of the scope table 1600. The service name 1953 indicates the name of a service corresponding to the scope ID 1952. The service name, meanwhile, indicates a service realized by accessing a resource provided by the resource server module 700 in the resource server 300. In the present embodiment, the resource server 300 provides a variety of services through access to the resource server module 700 in the resource server 300. One such service is, for example, a form service provided by the resource server module 700 as an API. The API usage limit number 1954 indicates usage limit numbers for APIs of various types of services provided by the resource server module 700 as APIs. This value is set through a procedure illustrated in FIG. 6. In the present embodiment, a restriction is placed on a usage number of each API (called an "API usage number") within a set period for each tenant, based on the concept of QoS (Quality of Service). This is done in order to prevent a drop in the quality of the various types of services provided by the resource server module 700 due to tenant services, or in other words, APIs, being used excessively. In the present embodiment, an API usage restriction is placed on the provision of services for a single tenant. Specifically, the restriction is carried out by setting a limit on the usage number of the APIs that provide various types of services within a unit period, for each tenant. If the unit period is a predetermined length of time, the period may be one day, one month, or the like, for example. The unit period may be set universally or may be set on a tenant-by-tenant or service-by-service basis. This unit period is updated for as long as the contract to provide the service is continued, and a new unit period is started at the point in time when the previous unit period ends. The API usage number 1955 records how many times the API indicated by the scope ID 1952 has been used by the tenant indicated by the current tenant ID 1951. This is reset to 0, for example, each time a new unit period is started. For example, a timer or the like is used to manage whether the unit period has been reached, and when the unit period has been reached, the API usage number 1955 is reset to 0 and the passage of the next unit period is measured. The API ID List 1956 is a list of the names of the specific APIs that configure the service indicated by the scope ID 1952. In the present embodiment, there are cases where a single service is configured using a single API, and cases where a single service is configured using multiple APIs. However, in either case, a single service is indicated by a single scope ID. Details of processing related to the API usage number management table 1950 will be given later.

API Limit Number Setting Process

Figure 6:
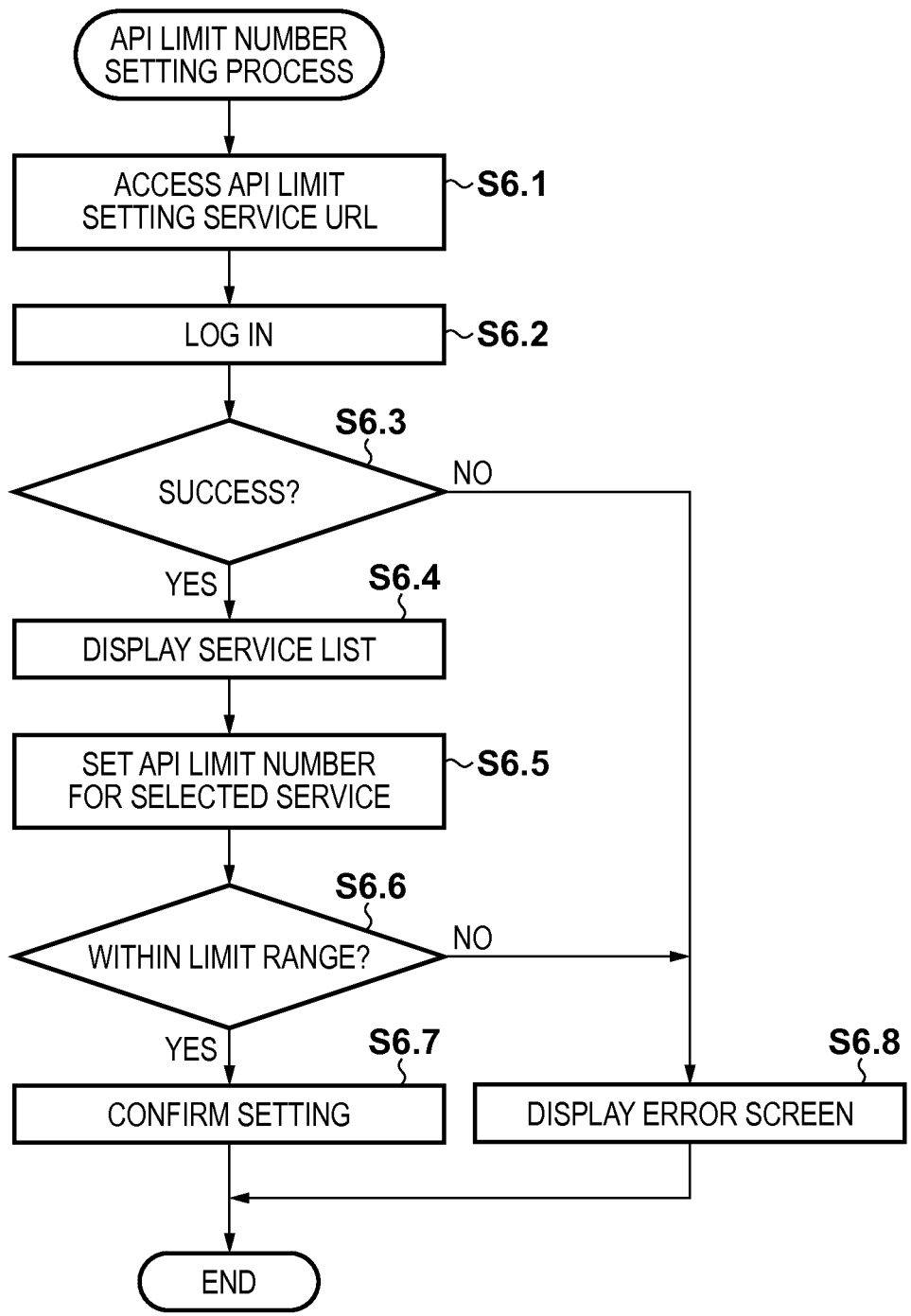
FIG. 6 is a flowchart illustrating API limit number setting.

A flowchart indicating an API limit number setting process performed by the authorization server module 600 according to the present embodiment will be described using FIGS. 6, 7A, and 7B. This flowchart illustrates a flow carried out when a master user sets the API usage limit number in the authorization server module 600 through the terminal 400. In FIG. 6, steps S6.1, S6.2, S6.5, and S6.7 indicate processes involved in inputs to the terminal and sending information to a server, whereas the other steps indicate processes performed by the authorization server 200 including the authorization server module 600 and the HTTP server module 610. Note that in the case where there is a separate authentication server, an authentication procedure of step S6.3 is carried out by that authentication server.

In S6.1, the master user uses the web browser 820 of the terminal 400 to make a request, to the HTTP server module 610 of the authorization server 200, for setting the API limit number. Note that a trigger for the web browser 820 of the terminal 400 making the API limit number setting request is as follows. The descriptions of the present embodiment assumes that the master user of the terminal 400 uses the web browser 820 to access a URL that provides an API limit number setting screen (this URL is assumed to be already known). The API limit number setting screen is included in the authorization server module 600 of the authorization server 200.

The HTTP server module 610 that has accepted the API limit number setting request from the web browser 820 receives an authorization request. Then, in S6.2, the HTTP server module 610 returns a login screen for authenticating the user to the web browser 820. FIG. 7A illustrates an example of the login screen returned by the HTTP server module 610. The screen in FIG. 7A includes a user ID input field 2001 into which a user ID is input, a password input field 2002 into which a password is input, and a login button 2003 for executing the login operation.

In S6.2, the user inputs the required information, namely a user ID and password, into the screen shown in FIG. 7A that is displayed in the web browser 820, and presses the login button 2003, whereupon the web browser 820 sends the input information to the HTTP server module 610. In S6.3, the HTTP server module 610 obtains the user ID and the password from the web browser 820 and authenticates the user by verifying whether or not there is a set of information that matches the user ID 1701 and the password 1702 in the user management table 1700. In the case where the user authentication fails, or in other words, in the case where the information that has been obtained is not registered in the user management table 1700, the HTTP server module 610 returns an authentication error screen (not shown) to the web browser 820 in S6.9. It is possible to use another method for authenticating the user, such as using an X.509 certificate, multi-step authentication in which multiple passwords are input, or the like, and the method for authenticating the user is not limited to the method described here.

In the case where the login is successful in S6.3, in S6.4, the authorization server module 600 of the authorization server 200 displays a service list screen 2400, shown in FIG. 7B, through the HTTP server module 610. The service list screen 2400 is an input screen that displays, in a tenant/user display region 2401, the tenant ID and user ID of the user that successfully logged in in S6.2. A list of services that can be used by the user that successfully logged in in S6.2 is also displayed in an API limit number list display region 2402. The API limit number list display region 2402 is configured of service names 2403 and API limit numbers 2404. Of these, the service names 2403 displays a list of the names of services that can be used by the tenant indicated by the tenant ID, which belongs to the logged-in user currently displayed in the tenant/user display region 2401. Specifically, the API usage number management table 1950 is searched using the tenant ID of the logged-in user, and all of the service names 1953 corresponding to the matching tenant ID are displayed.

In S6.5, the logged-in user uses the web browser 820 to select a service name 2403 for which the API limit number is to be set, and using the user interface, inputs an API limit number in the API limit number 2404 field in the same line as the service name. With respect to a range for values that can be set for the API limit number, there is a maximum value defined by restrictions of computational resources such as the CPU, memory, and the like of the authorization server 200, the number of tenants to which services are to be provided, and so on, and thus the user can set the limit number within a range that does not exceed the maximum setting value. Once the API limit numbers 2404 have been set for each service displayed in the service names 2403, the API limit number setting is finalized for the services by an OK button 2405 being pressed.

In S6.6, the authorization server module 600 of the authorization server 200 determines whether the API limit number set by the user exceeds the maximum setting value. If the set API limit number does not exceed the maximum setting value, in S6.7, the authorization server module 600 of the authorization server 200 displays the setting value and ends the process. However, if the set number exceeds the maximum setting value, an error (not shown) indicating that the maximum setting value has been exceeded is displayed, and the process then ends.

Note that the present embodiment assumes that the sum of the limit numbers set for individual services (that is, individual APIs) for a given tenant is not allowed to exceed a maximum number for that tenant. Accordingly, the maximum number is divided equally for each API and set and displayed as the default value in the API limit numbers 2404, for example. If an API limit number setting value has been input for a given service, a difference between that setting value and the default value is allocated automatically to the other services, set, and displayed once again. The allocation to the other services is assumed to be almost uniform, for example. By doing so, the usage limit number for individual services are not affected by the usage situations of other services. Note that the sum of the limit numbers set for individual services (in other words, APIs) for a given tenant may also be allowed to exceed the maximum number for that tenant. However, if the limit numbers of the respective services are all set for the maximum number, the same problem as with the related art will occur as a result. To avoid this, the configuration may be such that a maximum value for the API limit number that can be set for each service (called a service-by-service maximum number) is provided, or the sum of the API limit numbers that can be set for each service in a given tenant is allowed to exceed the maximum number of that tenant by a predetermined percentage or a predetermined value.

A limit is set for the API usage number on a service-by-service basis within a unit period through the procedure described above.

Resource Obtainment Sequence

A sequence performed in the application module 800 from client registration to resource obtainment according to the present embodiment will be described using FIG. 8. This sequence illustrates a flow carried out when a user uses the terminal 400 to use an application module 800 that is not yet registered in the authorization server module 600. The configuration can also be implemented so that, for example, client registration is only carried out the first time in the application module 800 of the terminal 400, and the process is subsequently executed from the sequence for obtaining an access token.

Figure 14:
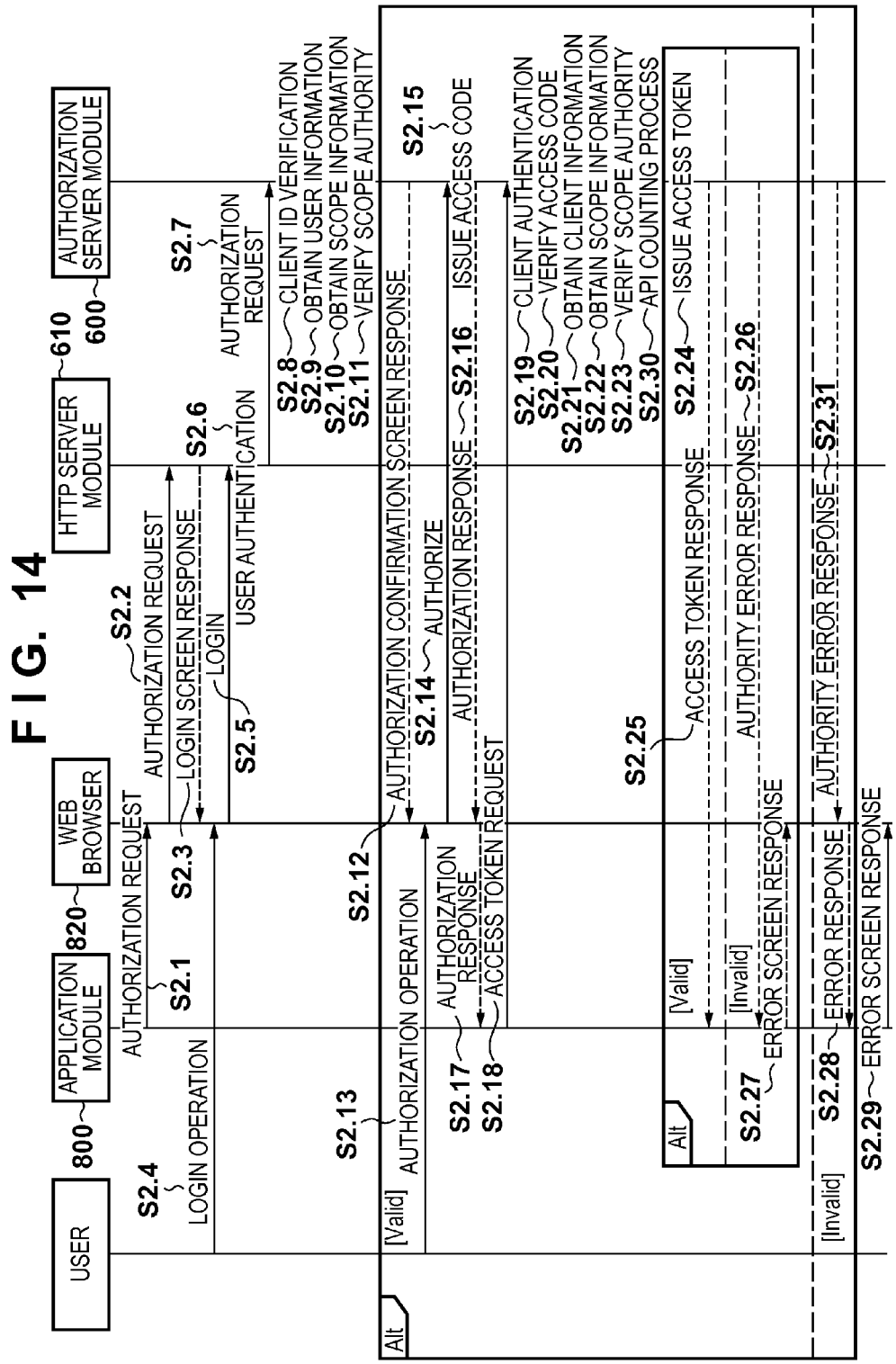
FIG. 14 is a diagram illustrating an access token issuing sequence in the case of an Authorization Code Grant.

First, a client registration sequence carried out in the application module 800 will be described using FIG. 8. In S1.1, the application module 800 of the terminal 400 makes a client registration request to the HTTP server module 610 of the authorization server 200. Note that the present embodiment describes the user installing the application module 800 and launching the application module 800 for the first time in the terminal 400 as a trigger for the application module 800 to make the client registration request. Note that the timing at which the user selects a function in the application module 800 and a resource request is issued to the resource server 300 can be thought of as another trigger. The application module 800 may be provided with an operation for explicitly starting, and the timing at which the user carries out that operation using the terminal 400 can be thought of as another trigger. Note that the client registration request includes a client name and a redirect URL for using an Authorization Code Grant. The configuration may be such that attribute information such as a character string for describing the client, the URL of a site that provides a description, or the like is included as other information. The Authorization Code Grant is a procedure whereby authority is delegated from a user having the authority to use a service so that a cooperating application (client) can use an API publicized by the service, and is defined in OAuth 2.0. The Authorization Code Grant procedure will be described later with reference to FIG. 14 and the like.

Having accepted the client registration request from the application module 800, the HTTP server module 610 starts negotiation for SSL/TLS communication. At this time, with respect to a device registration request, a setting is made to request client authentication, and thus a request for a certificate is issued to the application module 800. In S1.2, using a certificate set in a certificate store (not shown), the HTTP server module 610 verifies the certificate obtained from the application module 800 and authenticates the application module 800 as the source of the device registration request. Although the present embodiment describes an authentication method that uses an SSL/TSL certificate as the method for authenticating the origin of the client registration request, a method that uses an ID and a password, such as Basic authentication and Digest authentication, can be considered as well, for example. Furthermore, a configuration is also possible in which a means for authenticating these subjects is established, a means for issuing an access token for registering the client to the authenticated subjects is provided, and the client registration is accepted by verifying that access token. The HTTP server module 610 returns an error to the application module 800 in the case where the authentication fails.

In S1.3, after the application module 800 has been authenticated, the HTTP server module 610 communicates the client registration request received from the application module 800 to the authorization server module 600. Information for identifying the authenticated application module 800 is also communicated at this time. More specifically, information of the obtained certificate is communicated.

In S1.4, the authorization server module 600 obtains the information of the certificate communicated from the HTTP server module 610. Next, in S1.5, the authorization server module 600 specifies information of the certificate management table 1200 using the serial number, issuer, and owner of the obtained certificate as keys, and obtains information of the tenant master DN 1206. The configuration can also be such that the verification is carried out using the start date 1204 and the end date 1205 as a period of validity. Here, in the case where there are no records in the certificate management table 1200, the validity period was not successfully verified, or the like, the authorization server module 600 returns an error to the application module 800 via the HTTP server module 610.

Next, in S1.6, the authorization server module 600 obtains the tenant ID 1303 from the client management table 1300 using the obtained tenant master DN 1206 as a key. The default authority ID 1402 is then obtained from the default authority management table 1400 using the obtained tenant ID 1303 as a key. It may be the case that multiple default authority IDs 1402 are obtained. Meanwhile, in the case where not even one ID is registered in the default authority management table 1400, nothing is registered in the client authority table 1500, which will be described later.

Next, in S1.7, the authorization server module 600 newly registers the client in the client management table 1300 based on the obtained information. More specifically, the client ID and the secret are issued, the DN is created, and these pieces of information are held in 1301, 1302, and 1305, respectively. The obtained client name, redirect URL, and tenant ID specified by the tenant master DN 1206 are then stored in 1306, 1307, and 1303. The type 1304 is set to "general" at this time. Then, in S1.8, the authorization server module 600 stores, in the client authority table 1500, the client ID that has been issued and registered and the default authority ID obtained from the default authority management table 1400. At this time, multiple pieces of data are stored in the case where multiple default authority IDs have been obtained.

After the registration is complete, in S1.9, the authorization server module 600 returns the issued client ID and secret to the application module 800 via the HTTP server module 610.

The foregoing has described client registration. Through this sequence, when a client is registered online, the application module 800 can be identified and the appropriate authority can be provided.

Next, a sequence performed in the application module 800, from the obtainment of the access token to the obtainment of a resource using the access token, will be described using FIG. 8. Note that in FIG. 8, "Ref" indicates a reference, which will be described using a different diagram. "Alt", meanwhile, indicates a branch, and indicates branching based on conditions such as a result of a previous process. The process carried out after the branch is either of the processes denoted within the box labeled "Alt".

In S1.10, the application module 800 starts the obtainment of the access token. Note that a case where the user uses the terminal 400 to start the application module 800 can be thought of as a trigger for the obtainment of the access token to start. The application module 800 may be provided with an operation for explicitly starting, and the timing at which the user carries out that operation using the terminal 400 can be thought of as another trigger. Here, the process for issuing the access token is carried out in accordance with the flow defined in OAuth 2.0. In the present embodiment, the flow of S1.10 includes two cases, namely Authorization Code Grant and Client Credentials Grant, and these respective processes will be described. The access token issuing process through the Authorization Code Grant flow will be described later using FIGS. 14, 15A, 15B, and 15C. Likewise, the access token issuing process through the Client Credentials Grant flow will be described later using FIG. 9. The access token issuing process according to the present embodiment is carried out using one of these flows. In S1.11, the application module 800 obtains the access token through the corresponding access token obtainment flow. In S1.12, the application module 800 makes a resource request to the resource server module 700 using the obtained access token. The resource request can be carried out by reading out the API corresponding to the resource. The resource server module 700 receives the request and returns the response via the HTTP server module 710, which is not shown in FIG. 8.

In the present embodiment, the resource request corresponds to a service request through a REST API call. A configuration is also possible in which all API operations in the present embodiment are executed over SSL and mutual authentication is carried out using X.509 certificates.

The application module 800 can access the various types of APIs provided by the resource server module 700 by including the obtained access token in "Authorization: Bearer" of the HTTP header. For example, the following is obtained when calling a form creation API.
POST/oauth2/v1/form/create HTTP/1.1
Authorization: Bearer 7Fjfp0ZBr1KtDRbnfVdmIw
Host: example.com
Here, "7Fjfp0ZBr1KtDRbnfVdmIw" is the access token.

Meanwhile, the REST API header is as follows when calling an API that uploads a CSV file and creates a data set, for example.
POST/oauth2/v1/dataset/upload HTTP/1.1
Authorization: Bearer 7Fjfp0ZBr1KtDRbnfVdmIw
Host: example.com.
With respect to the CSV file that is actually uploaded, this API mimics the behavior of the user entering data into the form in the web browser and pressing a "send" button. That is, POST data is sent as Content-Type: multipart/form-data in accordance with RFC 2388. Meanwhile, the following is obtained when calling an API that prints the created data, for example.
GET/oauth2/v1/print?printerid=xxxx&jobid=yyyy HTTP/1.1
Authorization: Bearer 7Fjfp0ZBr1KtDRbnfVdmIw
Host: example.com.

In S1.13, the resource server module 700 makes an access token verification request to the authorization server module 600. Although the present embodiment describes the communication between the resource server module 700 and authorization server module 600 as being carried out over the LAN 101, a configuration in which this communication is carried out over the WAN 100 is also possible. At this time, the communication is carried out via the respective HTTP server modules 610 and 710. The processing by which the authorization server module 600 verifies that access token, which is carried out upon the access token verification request being received, will be described later using FIG. 10. In the case where the access token verification has resulted in the access token being verified as authentic, the resource is allowed to be accessed without requesting the input of credentials.

In S1.14, the resource server module 700 receives an access token verification response from the authorization server module 600. In the case where the verification result indicates "valid" in S1.14, a resource obtainment process is carried out in S1.15. Then, in S1.16, the obtained resource is returned to the application module 800 and the process ends. On the other hand, in the case where the access token verification response result indicates "invalid" or there is an API limit management error, an error response is sent to the application module 800 in S1.17, after which the process ends.

The foregoing has described a sequence performed in the application module 800, from the obtainment of the access token to the obtainment of a resource using the access token.

Access Token Issuing Process Through Authorization Code Grant

Next, an access token issuing process in the case of an Authorization Code Grant according to OAuth 2.0 will be described using FIGS. 14, 15A, 15B, and 15C. In S2.1 of FIG. 14, the application module 800 makes an authorization request to the HTTP server module 610 via the web browser 820. In the HTTP server module 610, the endpoint that accepts the authorization request is set to request a user authentication instead of a client authentication. Note that the authorization request includes at least a client ID obtained as a result of client registration and a registered redirect URL, as well as one or more scope IDs including at least one owner scope indicating a range of resources expected to be obtained. The necessary scope IDs are known by the application module 800 in advance.

Figure 15A:
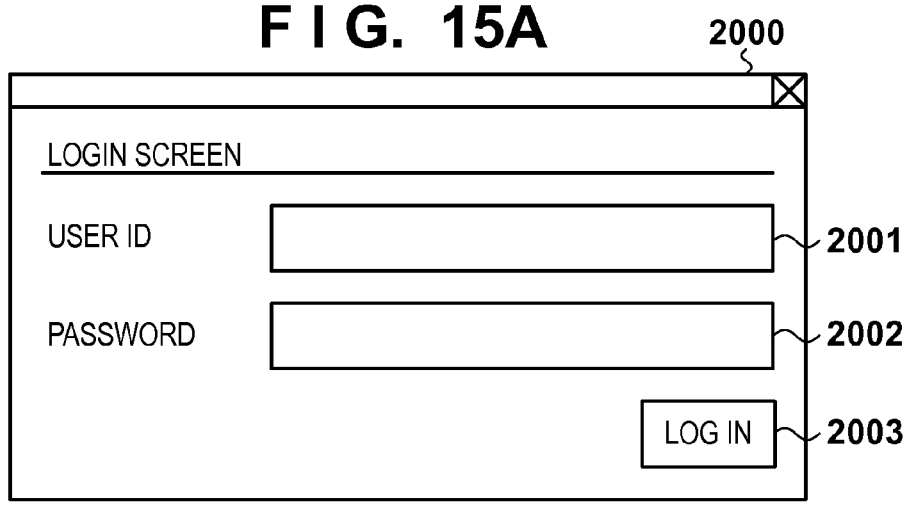
FIGS. 15A-15C are diagrams illustrating a user interface employed in the access token issuing sequence in the case of an Authorization Code Grant.

In S2.2, the HTTP server module 610 receives the authorization request. Then, in S2.3, the HTTP server module 610 returns a login screen for authenticating the user to the web browser 820. FIG. 15A illustrates an example of the login screen returned by the HTTP server module 610. The screen in FIG. 15A includes the user ID input field 2001 into which a user ID is input, the password input field 2002 into which a password is input, and the login button 2003 for executing the login operation.

In S2.4, the user enters the required information into the screen shown in FIG. 15A that is displayed in the web browser 820, and presses the login button 2003. In S2.5, the web browser 820 sends the entered information to the HTTP server module 610. In S2.6, the HTTP server module 610 obtains the user ID and the password from the web browser 820 and authenticates the user by verifying whether or not there is a set of information that matches the user ID 1701 and the password 1702 in the user management table 1700. The authentication is successful when there is a match. In the case where the user authentication fails, or in other words, in the case where the information that has been obtained is not registered in the user management table 1700, the HTTP server module 610 returns an authentication error screen (not shown) to the web browser 820. In the case where the user authentication is successful, the HTTP server module 610 generates an authentication token. This authentication token is stored in a non-volatile memory in the HTTP server module 610 in association with the user ID. Then, in S2.7, the HTTP server module 610 communicates the authorization request received from the application module 800 to the authorization server module 600. At this time, the generated authentication token is communicated as well. Although the present embodiment uses password authentication, the method is not limited thereto, and a configuration in which another method serving as a way to authenticate a user, such as using an X.509 certificate, multi-step authentication in which multiple passwords are input, or the like is used can be employed as well.

In S2.8, the authorization server module 600 verifies whether the set of the client ID and the redirect URL in the authorization request is correct. More specifically, it is verified whether a set that matches the set of the client ID 1301 and the redirect URL 1307 registered in the client management table 1300 has been registered. In the case where there is no match, the authorization server module 600 returns an error screen (not shown) to the web browser 820 via the HTTP server module 610. However, in the case where there is a match, in S2.9, the authorization server module 600 obtains user information. More specifically, the associated user ID is obtained from the HTTP server module 610 using the authentication token communicated from the HTTP server module 610. For example, because the HTTP server module 610 has received the login information including the user ID along with the access token, the user ID associated with the access token is obtained from the HTTP server module 610. Based on this user ID, the authority ID 1802 is obtained from the user authority table 1800. At this time, the obtained authority ID 1802 is not limited to a single ID, and 0 or multiple authority IDs 1802 may be obtained. Although the present embodiment describes the obtainment of the user information as being carried out through a method that obtains the user ID based on the authentication token, after which the authorization server module 600 obtains the user information, the method is not limited thereto. For example, a configuration in which the required user information is communicated from the HTTP server module 610 is also possible, as is a configuration in which the required user information is obtained by passing the authentication token to the HTTP server module 610.

In S2.10, the authorization server module 600 obtains the authority ID 1604 of each scope from the scope table 1600 using the scope ID of the scope included in the authorization request as a key. Then, in S2.11, the authorization server module 600 verifies whether the authority ID 1604 obtained for each scope is included in the authority ID 1802 corresponding to the user ID obtained in S2.9 from the user authority table 1800. The authorization request is accepted in the case where the all authorities belonging to the scope included in the authorization request from the user have been provided to that user, and is rejected when such is not the case. Specifically, the authority IDs associated with the scope ID included in the authorization request are obtained from the scope table 1600, and the authorization request is determined to be valid in the case where the authority IDs obtained in association with the user of the user authority table 1800 are set. Here, in the case where there are multiple authority IDs 1604 associated with the scope ID in the scope table 1600, if at least one authority ID of those multiple authority IDs 1604 is set for the user in question, the authorization request regarding that authority is considered to be valid.

Figure 15B:
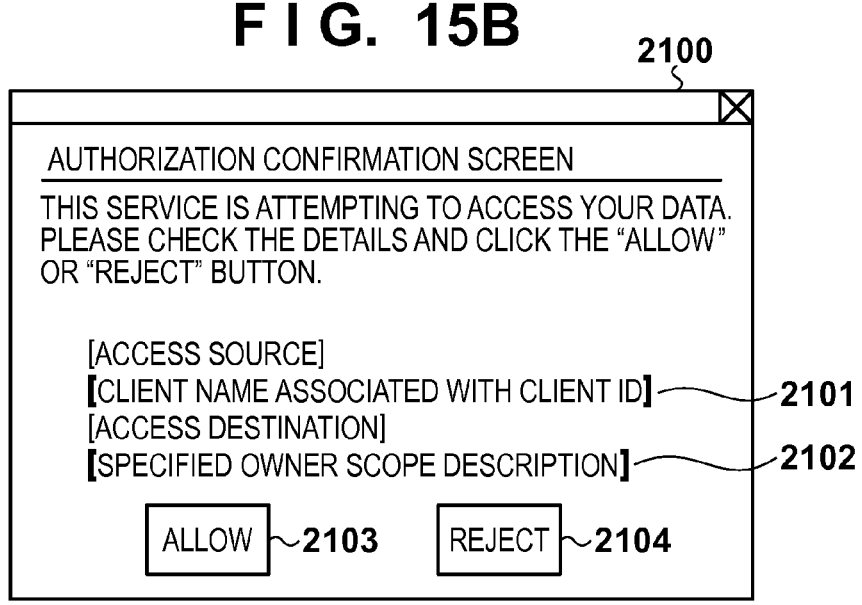
Figure 15C:
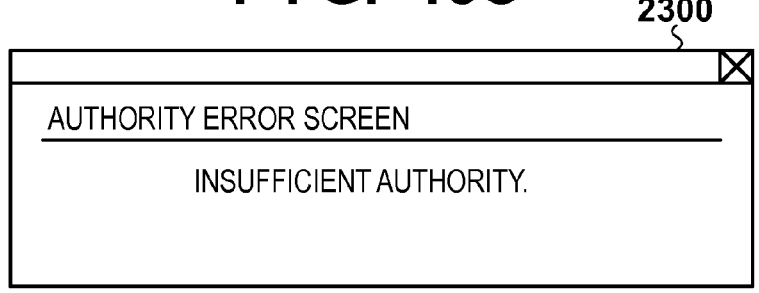

Alternatively, in the case where all of the authority IDs associated with the requested scope are set for the user in question, the authorization request related to that authority may be considered to be valid for the first time. Meanwhile, in the case where an authority ID associated with the scope ID is not set for that user, the authorization request related to that authority is considered to be invalid regardless of the user's authority. In the case where at least one authority ID in the scope included in the authorization request is invalid, in S2.28, the authorization server module 600 returns an authority error to the web browser 820. Then, in S2.29, the web browser 820 returns the authority error to the application module 800. More specifically, a redirect is returned to the web browser 820 so that the web browser 820 redirects to the redirect URL obtained at the time of the authorization request. In S2.30, the application module 800 returns an authority error screen, an example of which is shown in FIG. 15C, to the web browser 820, after which the process ends.

In the case where the authority IDs are valid for all the scopes included in the authorization request, in S2.12, the authorization server module 600 returns an authorization confirmation screen to the web browser 820. FIG. 15B illustrates an example of the authorization confirmation screen returned here. An authorization confirmation screen 2100 includes an access source display region 2101, which is a region that displays the client name 1306 obtained from the client management table 1300 using the client ID included in the authorization request as a key. The authorization confirmation screen 2100 also includes a scope display region 2102, which is a region that displays the description 1603 of the scope obtained from the scope table 1600 using the scope ID included in the authorization request as a key. Furthermore, the authorization confirmation screen 2100 includes an allow button 2103 through which a user executes an authorization operation for the details of the aforementioned information, and a reject button 2104 that executes a rejection. In the case where the user has pressed the reject button 2104, the authorization server module 600 returns an authority error to the application module 800 in S2.28, in the same manner as when a result of verifying the owner authority indicates "invalid". The configuration may be such that the authority error responses are displayed in a screen by the application module 800 that receives the responses, or text is changed so that the details of the error responses can be distinguished.

In S2.13, in the case where the user has pressed the allow button 2103 in the authorization confirmation screen 2100, or in other words, in the case where the authorization operation has been carried out, the authorization server module 600 is notified in S2.14 that the authorization is successful, via the web browser 820.

In S2.15, the authorization server module 600 issues an access code. More specifically, an access token ID is issued, the scope ID and client ID included in the authorization requests are authenticated, and the user ID of the user for whom authorization has been obtained is registered in the access token management table 1900 as an owner ID 1906. At this time, the token type 1902 is used as the access code, and a date until which the access code is valid is registered in the expiration date 1903. Then, in S2.16 and S2.17, the authorization server module 600 sends, to the application module 800, an authorization response including the access token ID of the issued access code, via the web browser 820. More specifically, a redirect is returned to the web browser 820 so that the web browser 820 redirects to the redirect URL obtained at the time of the authorization request.

In S2.18, the application module 800 requests an access token from the authorization server module 600. This access token request includes at least the obtained access code, client ID, secret, and the redirect URL sent at the time of the authorization request.

In S2.19, the authorization server module 600 uses a set including the obtained client ID and secret to authenticate the client. More specifically, the authentication is carried out by verifying a match with a set of the client ID 1301 and the secret 1302 in the client management table 1300. In the case where a client authentication has failed, the application module 800 returns an authentication error. In the case where the client authentication is successful, the authorization server module 600 verifies the obtained access code in S2.20. The access code is verified by determining whether the access token ID in the obtained access code is registered in the access token management table 1900, and verifying whether the expiration date 1903 has not yet been passed in the case where the access token ID is registered. In the case where the access token ID is not registered, an authorization error is returned in S2.26. Furthermore, it is verified whether the redirect URL obtained through the access token request matches the redirect URL 1307 registered in the client management table 1300, using the client ID 1905 associated with the access token ID as a key. In the case where the access code verification result indicates "invalid", the authorization server module 600 returns a token invalid error to the application module 800. However, in the case where the access code verification result indicates "valid", in S2.21, the authorization server module 600 obtains the client information. More specifically, the authority ID 1502 is obtained from the client authority table 1500, using the authenticated client ID as a key. At this time, zero or multiple authority IDs 1502 may be obtained.

In S2.22, the authorization server module 600 obtains the scope ID 1904 from the access token management table 1900, using the access token ID of the obtained access code as a key. Next, the authority ID 1604 of each scope is obtained from the scope table 1600, using the scope ID of the obtained scope as a key. At this time, in the case where the scope is not included in the scope ID obtained from the access token management table 1900, the client authority verification result indicates "valid". However, the standard processing carried out in step S2.23 may be executed instead of treating this case as an exception. In such a situation, the stated case will be determined to be invalid.

In S2.23, the authorization server module 600 verifies whether the authority ID 1604 for each scope obtained in S2.22 is included in the authority ID 1502 obtained from the client authority table 1500. The authorization request is accepted in the case where the all authorities belonging to the scope included in the access token requested by the client have been provided to that client, and is rejected when such is not the case. Therefore, to be more specific, the authority ID corresponding to the scope ID associated with the requested access token is obtained from the scope table 1600, and in the case where the authority ID obtained in association with that client in the client authority table 1500 is set in that authority ID, the authorization request is determined to be valid. Here, in the case where there are multiple authority IDs 1604 associated with the scope ID in the scope table 1600, if at least one authority ID of those multiple authority IDs 1604 is set for the client, the authorization request is considered to be valid. Alternatively, in the case where all of the authority IDs associated with the requested scope are set for the client in question, the authorization request related to that authority may be considered to be valid for the first time. In the case where an authority ID associated with the scope ID is not set, however, the authorization request is considered invalid regardless of the client authority. In the case where the verification indicates invalid for at least one authority ID in the scope associated with the access code, in S2.26, the authorization server module 600 returns an authority error to the application module 800. Then, in S2.27, the application module 800 returns the authority error screen, an example of which is shown in FIG. 15C, to the web browser 820, after which the process ends.

In the case where all of the scopes associated with the access code are valid, the authorization server module 600 executes an API counting process in S2.30. At this time, the process is executed using the scope and the authenticated client ID. The API counting process is a process for determining whether the usage number of the API being used will exceed the limit value. The API counting process is carried out according to the procedure shown in FIG. 11, which will be described in detail later. In the case where the API counting process has failed, the authorization server module 600 returns an error to the application module 800 and ends the process.

However, in the case where the API counting process is successful, the authorization server module 600 issues the access token in S2.24. More specifically, the access token ID is issued and the scope ID, owner ID, and authenticated client ID associated with the access code are registered in the access token management table 1900. At this time, the token type 1902 is used as the access token, and a date until which the access token is valid is registered in the expiration date 1903. Then, in S2.24, the authorization server module 600 returns the access token ID of the issued access token to the application module 800 and ends the process. A configuration in which the expiration date of the access token is returned at this time can also be employed. Although the present embodiment describes an example in which a refresh token for updating the access token is not issued, a configuration in which a refresh token ID and expiration date are managed in the access token management table 1900 can also be employed. Here, a configuration in which the refresh token is issued at the same time as the access token and the ID of the refresh token that was issued is included in the response to the access token can be employed.

Access Token Issuing Process Through Client Credentials Grant

Figure 9:
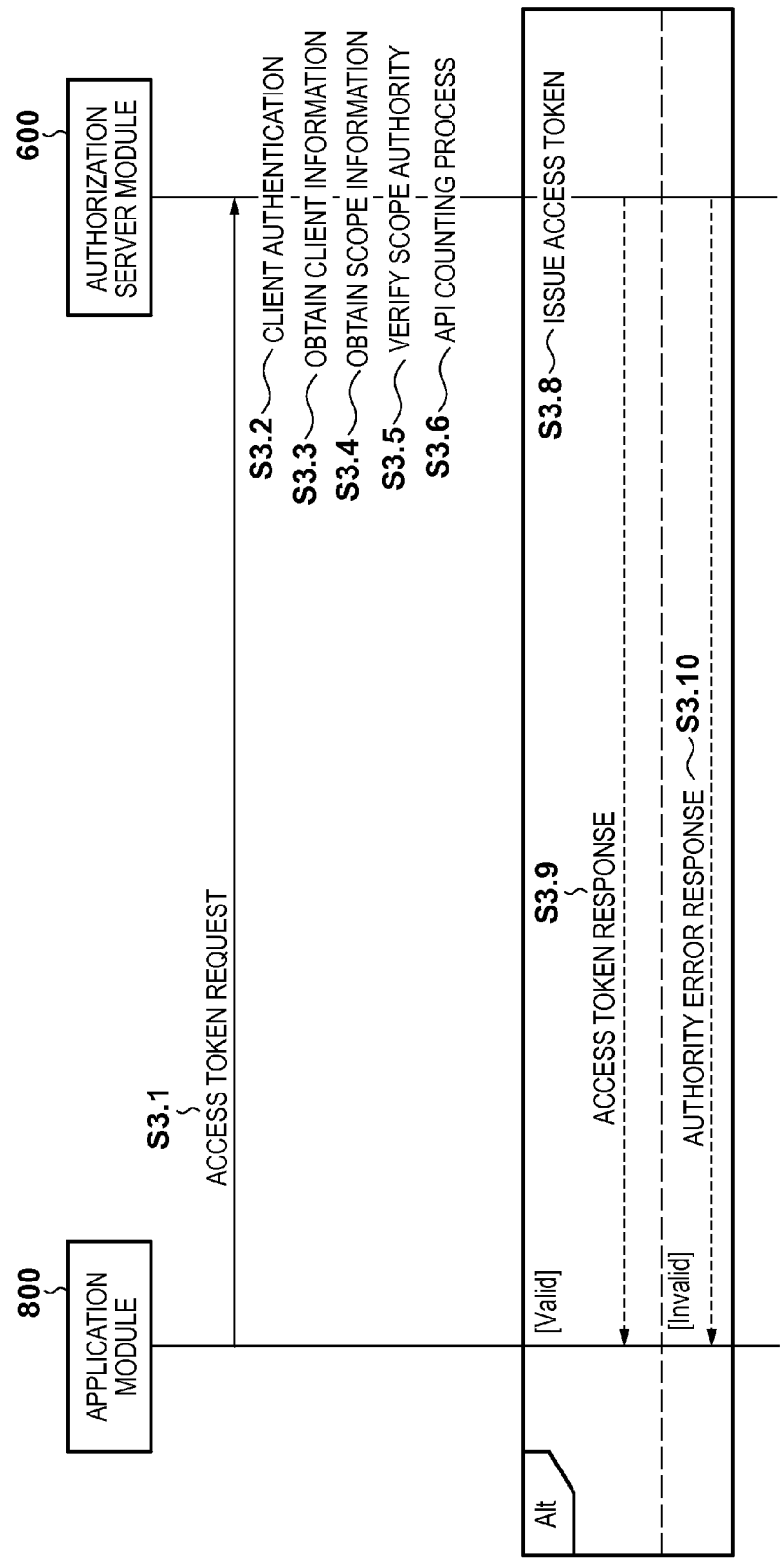
FIG. 9 is a diagram illustrating an access token issuing sequence in the case of a Client Credentials Grant.

Next, an access token issuing process in the case of the OAuth 2.0 Client Credentials Grant will be described using FIG. 9.

In S3.1, the application module 800 requests an access token from the authorization server module 600. This access token request includes one or more scope IDs that include at least the client ID, secret, and at least one scope indicating a range of resources expected to be obtained.

The scope in the present embodiment corresponds to an access API related to a resource that can be referred to by the scope, or to a group including a series of access APIs. The scope and access API also correspond to various types of services in the present embodiment. An access token including a single scope ID is required when calling an API for a single resource and a single service. Meanwhile, an access token including multiple scope IDs is required when calling an API for a series of services in which multiple services cooperate.

In S3.2, the authorization server module 600 uses a set including the obtained client ID and secret to authenticate the client. More specifically, the authentication is carried out by verifying a match with a set of the client ID 1301 and the secret 1302 in the client management table 1300. In the case where a client authentication has failed, the application module 800 returns an authentication error. In the case where the client authentication is successful, the authorization server module 600 obtains the client information in S3.3. More specifically, the authority ID 1502 is obtained from the client authority table 1500, using the authenticated client ID as a key. At this time, zero or multiple authority IDs 1502 may be obtained.

In S3.4, the authorization server module 600 obtains the authority ID 1604 of each scope from the scope table 1600 using the scope ID of the scope included in the access token request as a key. At this time, in the case where the scope is not included in the scope ID included in the access token request, the client authority verification result indicates "valid". However, the standard processing carried out in step S3.5 may be executed instead of treating this case as an exception. In such a situation, the stated case will be determined to be invalid.

In S3.5, the authorization server module 600 verifies whether the authority ID 1604 for each obtained scope is included in the authority ID 1502 obtained from the client authority table 1500. At this time, in the case where there are multiple authority IDs 1604 associated with the scope ID in the scope table 1600, if at least one authority ID of those multiple authority IDs 1604 is set for the client, the authorization request is considered to be valid. In the case where an authority ID associated with the scope ID is not set, however, the authorization request is considered invalid regardless of the client authority.

The process moves to S3.10 in the case where the verification result indicates "invalid" for at least one authority ID in the scopes included in the access token request. In S3.10, the authorization server module 600 returns an authority error to the application module 800 and ends the process.

In the case where the verification indicates "valid" for all of the scopes included in the access token request, the authorization server module 600 executes the API counting process in S3.6. At this time, the process is executed using the scope and the authenticated client ID. Details of the API counting process will be given later. In the case where the API counting process has failed, the authorization server module 600 returns an error to the application module 800 and ends the process.

However, in the case where the API counting process is successful, the authorization server module 600 issues the access token in S3.8. More specifically, the access token ID is issued, and the scope ID included in the access token request, the client ID of the authenticated client, the client ID serving as the owner ID are registered in the access token management table 1900. At this time, the token type 1902 is used as the access token, and a date until which the access code is valid is registered in the expiration date 1903. Then, in S3.9, the authorization server module 600 returns the access token ID of the issued access token to the application module 800 and ends the process. A configuration in which the expiration date of the access token is returned at this time can also be employed.

Access Token Verification Process

Figure 10:
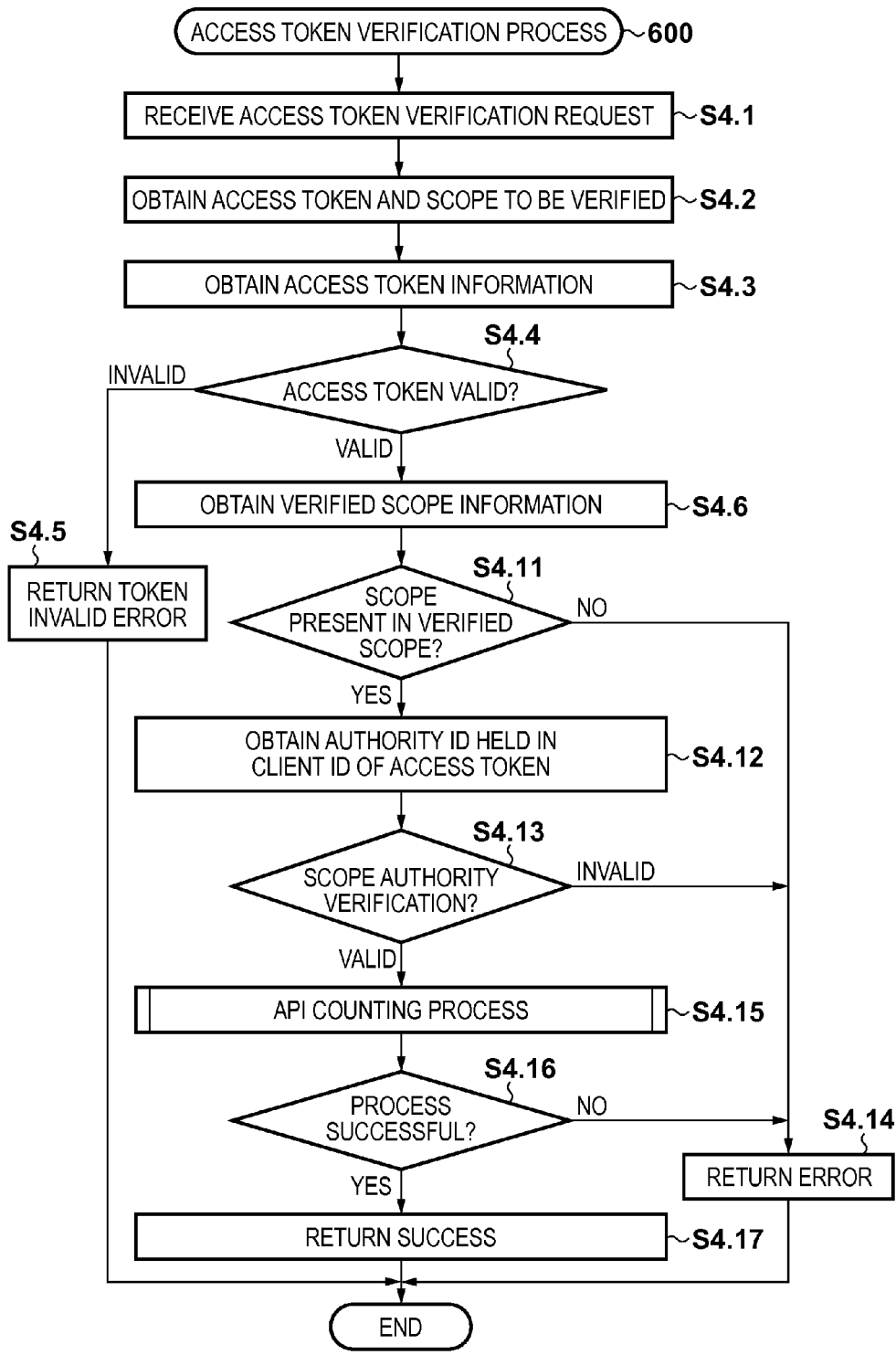
FIG. 10 is a flowchart illustrating an access token verification process.

Next, an access token verification process will be described using FIG. 10. FIG. 10 illustrates the flow of an access token verification process executed by the authorization server module 600. In the flow shown in FIG. 8, the application module 800 makes a resource request (API call) at S1.12, after obtaining the access token in S1.11. When a verification request is then issued to the authorization server module 600 from the resource server module 700 in response to the stated request, the authorization server module 600 carries out the access token verification process, and furthermore manages the API usage number limit by carrying out the API counting process. The verification process that includes the API counting process will be described next.

In step S4.1, the authorization server module 600 receives an access token verification request from the resource server module 700. The access token verification request includes the access token ID of the access token to be verified and at least one scope ID. In step S4.2, the authorization server module 600 obtains the access token ID and the scope ID. Next, in step S4.3, the authorization server module 600 obtains information of the access token based on the obtained access token ID. More specifically, the expiration date 1903 is obtained from the access token management table 1900 using the access token ID and a token type of "access token" as keys. Then, in step S4.4, it is verified whether the access token is present, or in other words, whether the access token is present in the access token management table 1900, and whether the access token is still within the expiration date. In the case where the verification indicates that the access token is not present or is present but is not within the expiration date, the access token is determined to be invalid, a token invalid error is returned in step S4.5, and the process ends. In the case where the verification result indicates that the access token is present and is within the expiration date, the process continues.

In step S4.6, the authorization server module 600 obtains information of the scope included in the verification request. More specifically, the type 1602 and authority ID 1604 of each scope is obtained from the scope table 1600, using the scope ID as a key.

Next, in step S4.11, the authorization server module 600 determines whether at least one client scope is included in the type 1602 of the one or more scopes obtained in S4.6. The process moves to step S4.15 in the case where there is not even one scope. However, in the case where there is at least one scope, the authorization server module 600 obtains the client information in step S4.12. More specifically, a client ID 1907 is obtained from the access token management table 1900 using the access token ID as a key, and the authority ID 1502 is obtained from the client authority table 1500 using the obtained client ID as a key. At this time, 0 or multiple authority IDs 1502 may be obtained.

Next, in step S4.13, the authorization server module 600 carries out authority verification on the client scope obtained in step S4.6. More specifically, the authority ID 1604 of each client scope is obtained from the scope table 1600, using the client scope ID obtained in S4.6 as a key. It is then verified whether the authority ID 1604 for each obtained client scope is included in the authority ID 1502 obtained in step S4.12. The access token is accepted in the case where the all authorities belonging to the scope associated with the client of the access token to be verified have been provided to that access token, and is rejected when such is not the case. Accordingly, for example, the authority ID corresponding to the scope ID associated with the access token to be verified is obtained from the scope table 1600, and in the case where the authority ID obtained in association with the client of that access token is set in that authority ID, that authorization request is determined to be valid. Here, in the case where there are multiple authority IDs 1604 associated with the client scope ID in the scope table 1600, if at least one authority ID of those multiple authority IDs 1604 is set for the client, the authorization request is considered to be valid. In the case where an authority ID associated with the client scope ID is not set, however, the authorization request is considered invalid regardless of the client authority. In the case where the result of the verification indicates "invalid" for at least one authority ID, the authorization server module 600 returns an authority error to the resource server module 700 in step S4.14 and ends the process. In the case where the verification result indicates "valid" for all of the client scopes obtained in S4.6, the authorization server module 600 moves to step S4.15.

In step S4.15, the authorization server module 600 carries out the API counting process, which will be described later, for managing the API usage limit number. In step S4.16, it is determined whether the API counting process has succeeded or failed, and in the case where the process has succeeded, a response indicating that the API can be executed is returned to the resource server module 700 in step S4.17, after which the process ends. However, if the API counting process has failed in step S4.16, the authorization server module 600 returns an API limit number management error to the resource server module 700, after which the process ends.

API Counting Process

Figure 11:
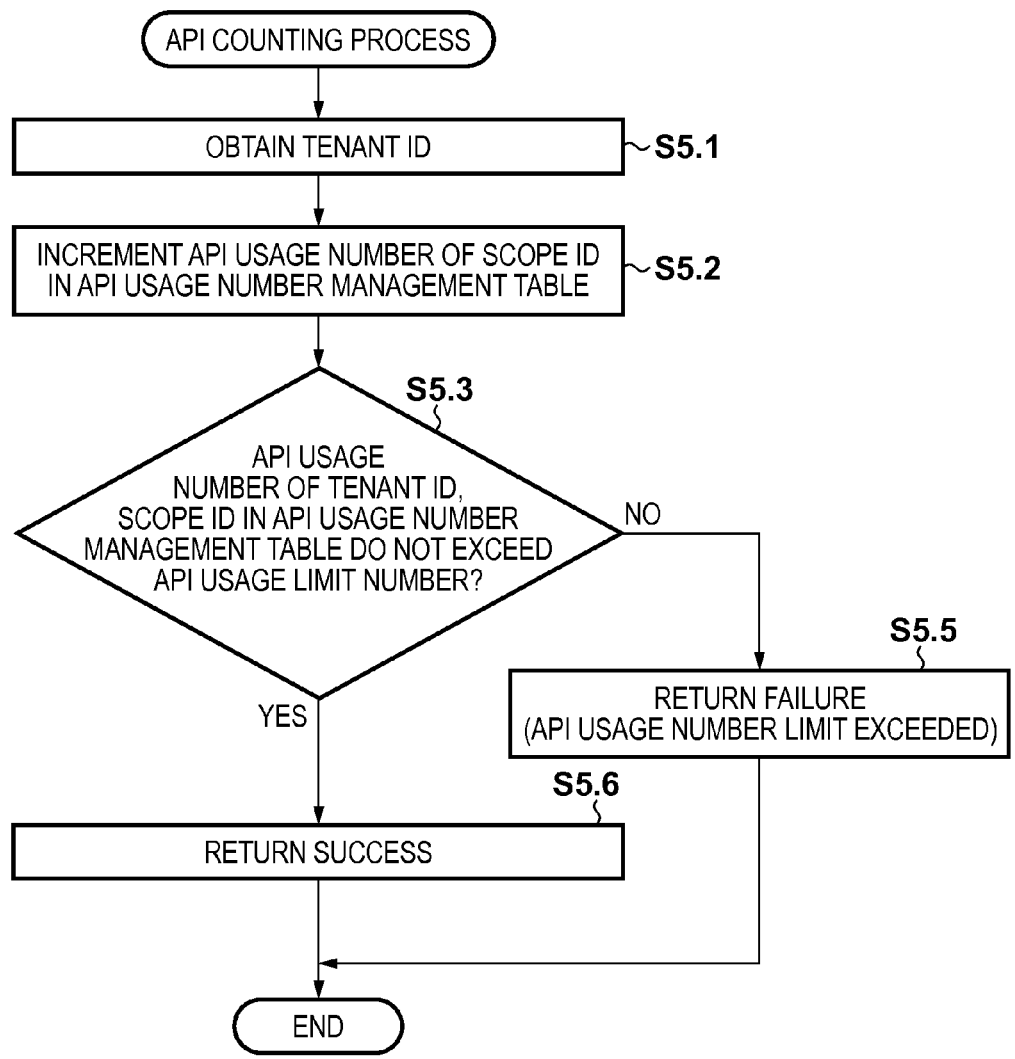
FIG. 11 is a flowchart illustrating an API counting process.

FIG. 11 is a flowchart illustrating an API counting process executed by the authorization server module 600 during the access token verification process shown in FIG. 10. In step S5.1, the authorization server module 600 obtains a tenant ID associated with the access token to be verified. Specifically, the client ID 1905 of the access token indicated by the access token ID 1901 in the access token management table 1900 is obtained. Furthermore, a row in the client management table 1300 shown in FIG. 4B corresponding to the client ID is referred to based on the client ID 1301, and the value of the corresponding tenant ID 1303 is obtained. Next, in step S5.2, the authorization server module 600 refers to the tenant ID 1951 and the scope ID 1952 in the API usage number management table 1950 that match the tenant ID and the scope ID obtained earlier. The API usage number 1955 in the column referred to earlier is then incremented. Furthermore, in step S5.3, the authorization server module 600 confirms the value of the API usage limit number 1954 in the column of the API usage number management table 1950 referred to earlier, and compares the API usage number 1955 (that is, an access number) to the API usage limit number 1954 (that is, an access limit number). If the API usage number 1955 has not exceeded the API usage limit number 1954 in step S5.3, it is determined that the API usage is within the API usage number limit, "success" is returned in step S5.4, and the process ends. However, if the API usage number 1955 has exceeded the API usage limit number 1954 in step S5.3, it is determined that the API usage has exceeded the API usage number limit, "failure" is returned in step S5.5, and the process ends.

Through these sequences, the resource server module 700 accepts only access from an application module 800 having the proper authority, and can prevent unintended authority errors from the application module 800. Furthermore, in the present embodiment, a call limit number for an access API or a group of a series of access APIs regarding a resource that can be referred to based on the scope can be managed on a tenant-by-tenant basis, and can furthermore be managed on a service-by-service basis. Accordingly, a drop in the quality of various types of services provided by the resource server module 700, caused by the excessive use of services and APIs in a specific tenant, can be prevented based on the QoS (Quality of Service) concept.

Furthermore, the API counting process, which determines whether or not the API usage number has exceeded a limit number within a set period, is carried out by the authorization server module 600 that receives the access token request during the access token obtainment process performed by the application module 800 (S2.30 and S3.6). This does not depend on whether the protocol being used is Client Credentials Grant or Authorization Code Grant. Furthermore, the API counting process is carried out in the access token verification process even after the access token has been obtained and even when a request for a resource is made to the resource server using that access token (S1.20). Through this, access tokens that cannot be used due to the limit on the usage number of the APIs included in the scope are no longer issued, which makes it possible to conserve processing resources, communication resources, and so on.

Second Embodiment

When there is an API usage limit number at the service level (scope level) for a specific tenant, and the client has used the API of a single service excessively and exceeded the limit, it is possible that a series of functions that combine the stated service with other services will encounter an error partway through. DataSetService, FormService, PrintService, and DataSetFormPrintService in the scope ID 1601 defined in the scope table 1600 shown in FIG. 5A and described in the aforementioned embodiment can be considered. Assume that a given tenant makes an API call corresponding to these four scopes, or in other words, makes a service request. At this time, the DataSetService scope corresponds to an API service in which the application module 800 uploads a local CSV file to the resource server module 700 and the resource server module 700 builds the uploaded CSV file and converts the file into a data set. The FormService scope corresponds to an API service in which the application module 800 specifies the data set in the resource server module 700 and creates a form. PrintService corresponds to an API service in which the application module 800 prints the form data in the resource server module 700. Furthermore, the DataSetFormPrintService scope corresponds to an API service in which the application module 800 consecutively calls the APIs of the DataSetService scope, the FormService scope, and the PrintService scope so as to upload a local CSV file, create a form, and print the form. The DataSetFormPrintService scope corresponds to a scope group according to the present embodiment. The scope group assigns a unique name to a combination of multiple scopes when a series of resources are obtained (an API is called) using an access token associated with the multiple scopes. The scope group configures the series of resource obtainments (API calls). The access token request indicated in FIG. 9 is issued, in the issuing sequence, as an access token including multiple scope IDs when the access token is actually issued. The scope group is defined in a scope group table within the authorization server module 600, shown in FIG. 5G, and is not known on the client side, such as the application module 800. Because the API specifies a service provided by that API, "API" and "service" correspond to each other. Accordingly, in the aforementioned embodiment, the API and the service provided by the API are collectively called an API service. Accordingly, the API service can also be referred to as a service and the API corresponding thereto.

When the application module 800 calls an API that specifies multiple scopes corresponding to the DataSetFormPrintService, in actuality, access token verification is carried out according to the flowchart shown in FIG. 10 for the DataSetService scope, the FormService scope, and the PrintService scope, and furthermore, the API counting indicated in FIG. 11 is carried out. At this time, if any of the three scopes reaches the API usage number limit, it is possible that the DataSetFormPrintService scope configured by cooperation of the series of services (which actually corresponds to multiple scopes being specified) will stop partway through without the API call being completed. Meanwhile, calling an API specifying multiple scopes can indicate a series of services by providing an ID of the scope group in the multiple scopes included in the series of services. The authorization server module 600 can distinguish between an API call for individual scopes by managing the API limit numbers for the scope group and individual scopes separately, and a call for a series of services indicated by multiple scopes. Through this, the API call specifying multiple scopes, configured by cooperation of the series of services, can be prevented from stopping partway through without the API call being completed.

It is assumed that the scopes that configure a scope group are pre-set in the system. A user may also be allowed to define the scope group. In the case where multiple scopes are specified in an access token request, and the multiple specified tokens exactly match the scopes defined in the scope group, the access token request for the multiple scopes is interpreted as specifying the scope group. With respect to the obtainment of resources (API calls) using an access token issued in response to the access token request specifying multiple scopes, the authorization server module 600 determines that the obtainment of resources (API call) specifies the scope group and carries out processing.

The second embodiment, which solves the aforementioned problem, will be described using FIGS. 5F, 5G, 12, and 13. Note that the second embodiment is the same as the aforementioned embodiment with the exception of the processing from the access token obtainment in S1.11 to the error response sequence in S1.17 shown in FIG. 8, and thus descriptions aside from those items will be omitted. Furthermore, the same sequence numbers are appended to sequences that execute the same processes as those described with reference to FIG. 8, and descriptions thereof will be omitted.

Scope Group API Management Table

FIG. 5F illustrates a scope group API management table 1980. The scope group API management table 1980 is defined in advance by the system, defined by the user, or both. The scope group API management table 1980 includes a tenant ID 1981, a scope ID 1982, a group execution number 1983, and an API usage number 1984. The tenant ID 1981 is configured so as to be referable with the tenant ID 1703 of the user management table 1700. The scope ID 1982 indicates a scope group ID. The group execution number 1983 indicates how many APIs in a series of APIs will be called by the application module 800 based on the access token associated with the multiple scope IDs corresponding to the scope group ID indicated by the scope ID 1982. The group execution number 1983 indicates a limit number, per unit period, placed on the number of times resources are requested as the scope group. Note that this number is limited to successful requests only. The API usage number 1984 records how many times the series of API calls have been made. Details of processing related to the scope group API management table 1980 will be given later.

Note that the API usage limit number 1954 for the scope group is set by the user, as indicated in FIG. 7B. Meanwhile, the group execution number 1983 indicates a number of executions as a group, and thus a value obtained by dividing the set API usage limit number 1954 by the number of scope IDs included in that scope group (discarding the remainder) may be set for the group execution number 1983. Conversely, an execution number as a group may be set, and that value may then be converted into individual API usage numbers and used as the API usage limit number 1954. In either case, it is necessary for the sum of the API usage number limit values to be no greater than the total usage number limit for the APIs in the tenant.

Scope Group Table

FIG. 5G illustrates a data table stored in an external memory of the database server 500 configured to be capable of communicating with the authorization server 200 over the LAN 101, in the same manner as FIGS. 5A, 5B, 5C, 5D, 5E, and 5F. These data tables can also be configured in an external memory of the authorization server 200.

FIG. 5G illustrates a scope group table 1990. The scope group table 1990 is configured of a scope group ID 1991, a scope ID list 1992, and a description 1993. The scope group ID 1991 indicates a scope group ID. The scope ID list 1992 indicates a list of the scopes that actually configure the scope group indicated by the scope group ID. In the present embodiment, a scope group having a scope group ID of DataSetFormPrintService is configured of three scopes, namely a DataSetService scope, a FormService scope, and a PrintService scope. When, using an access token associated with the three scopes corresponding to the DataSetFormPrintService scope group, the application module 800 executes a data upload service API, a form service API, and a print service API in series one at a time, the authorization server module 600 determines that the functions provided by the DataSetFormPrintService scope group have been provided one time.

Access Token Obtainment Process

Figure 12:
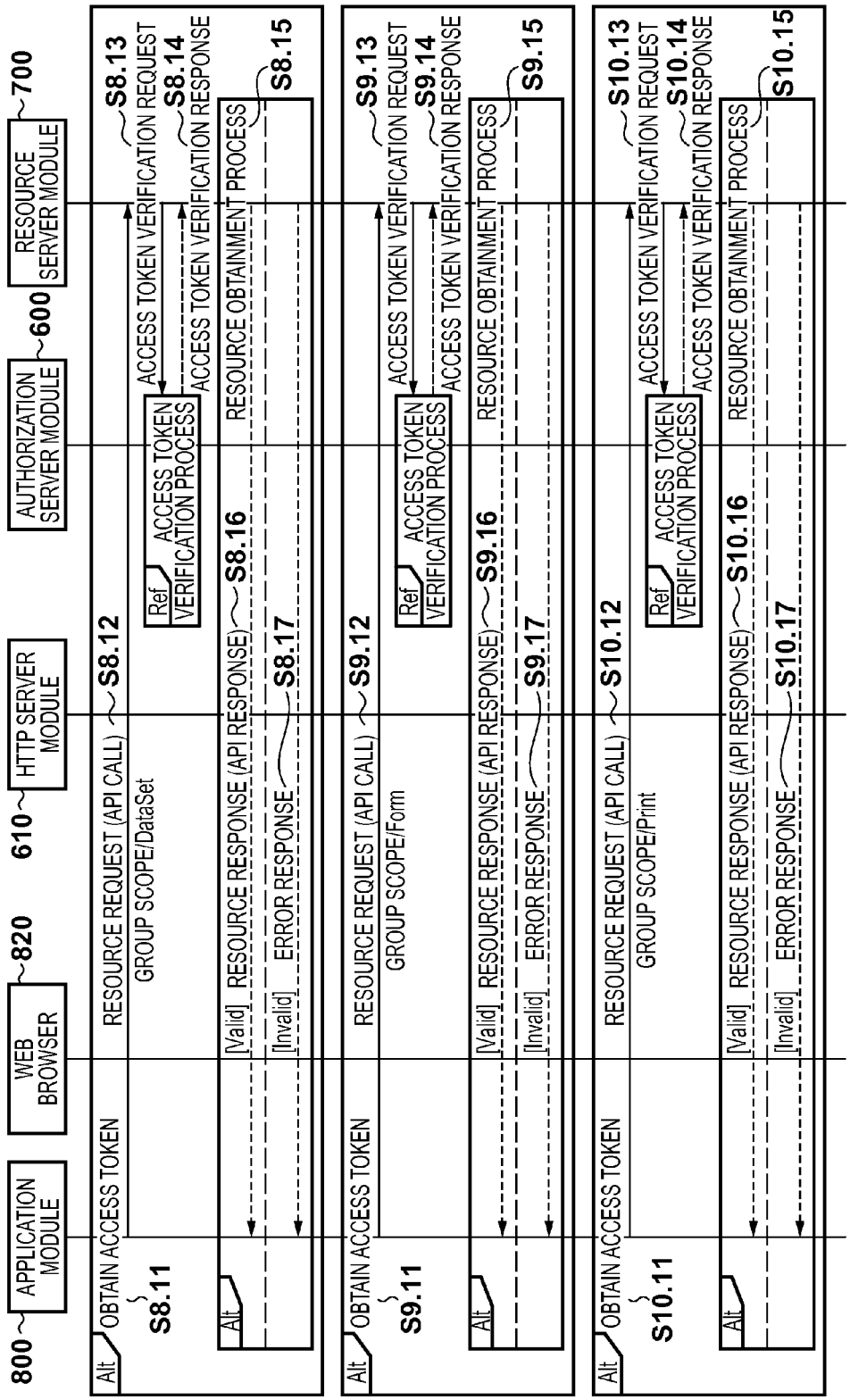
FIG. 12 is a diagram illustrating an API multiple call sequence according to a second embodiment.

FIG. 12 illustrates, of the sequence according to the second embodiment shown in FIG. 8, a sequence spanning from the application module 800 obtaining an access token specifying multiple scopes to the authorization server module 600 managing the API limit number of the scope group and obtaining resources (calling APIs) using the access token.

In the sequence shown in FIG. 8, the application module 800 requests an access token and obtains the access token in S1.11. When the application module 800 specifies multiple scopes when obtaining the access token, an access token corresponding to multiple scopes can be obtained based on the sequence shown in FIG. 8. At this time, in the case where the multiple scopes exactly match the scope ID list 1992 defined in advance in the scope group table 1990 in the authorization server module 600, the multiple scopes are recognized as a scope group in the authorization server module 600. The scope group is used, when the application module 800 obtains multiple resources (calls APIs) corresponding to the respective multiple scopes, for the authorization server module 600 to count up the series of resources being obtained (API calls) collectively, rather than on an individual basis. The obtainment of resources (API calls) by the application module 800 are differentiated in the authorization server module 600 as cases associated with a single scope and cases associated with multiple scopes.

Specifically, API calls associated with the single scope are realized as the following first, second, and third API calls.

First API Call

The obtainment of resources using the access token associated with the DataSetService scope (an upload service API call) is as follows. The access token ID associated with the DataSetService scope is "AT_0000001" in the access token ID 1901 of the access token management table 1900. The application module 800 carries out the API call by adding a Base64-encoded """QVRfMDAwMDAwMQ==" after ""Authorization: Bearer" of the API call.
POST/oauth2/v1/dataset/upload HTTP/1.1
Authorization: Bearer QVRfMDAwMDAwMQ==
Host: example.com.

Second API Call

The obtainment of resources using the access token associated with the FormService scope (a form service API call) is as follows. The access token ID associated with the FormService scope is "AT_0000002" in the access token ID 1901 of the access token management table 1900. The application module 800 carries out the API call by adding a Base64-encoded """QVRfMDAwMDAwMg==" after ""Authorization: Bearer" of the API call.
POST/oauth2/v1/form/create HTTP/1.1
Authorization: Bearer QVRfMDAwMDAwMg==
Host: example.com.

Third API Call

The obtainment of resources using the access token associated with the PrintService scope (a print service API call) is as follows. The access token ID associated with the PrintService scope is "AT_0000003" in the access token ID 1901 of the access token management table 1900. The application module 800 carries out the API call by adding a Base64-encoded """QVRfMDAwMDAwMw==" after ""Authorization: Bearer" of the API call.
GET/oauth2/v1/print?printerid=xxxx&jobid=yyyy HTTP/1.1
Authorization: Bearer QVRfMDAwMDAwMw==
Host: example.com.

In response to the first, second, and third API calls mentioned above, API calls associated with multiple scopes according to the present embodiment are as follows. That is, the obtainment of resources (API calls) using the access token associated with the three scopes, namely the DataSetService, the FormService, and the PrintService, are implemented as the following fourth, fifth, and sixth API calls.

Fourth API Call

The obtainment of resources (upload service API) based on the access token associated with a group scope that has the aforementioned three scopes is as follows. The access token ID associated with the DataSetFormPrintService scope is "AT_0000004" in the access token ID 1901 of the access token management table 1900. The application module 800 carries out the API call by adding a Base64-encoded """QVRfMDAwMDAwNA==" after ""Authorization: Bearer" of the API call.
POST/oauth2/v1/dataset/upload HTTP/1.1
Authorization: Bearer QVRfMDAwMDAwNA==
Host: example.com.

Fifth API Call

The obtainment of resources using the access token associated with a group scope that has the aforementioned three scopes (a form service API) is as follows. The access token ID associated with the DataSetFormPrintService scope is "AT_0000004" in the access token ID 1901 of the access token management table 1900. The application module 800 carries out the API call by adding a Base64-encoded """QVRfMDAwMDAwNA==" after ""Authorization: Bearer" of the API call.
POST/oauth2/v1/form/create HTTP/1.1
Authorization: Bearer QVRfMDAwMDAwNA==
Host: example.com.

Sixth API Call

The obtainment of resources (print service API) based on the access token associated with a group scope that has the aforementioned three scopes is as follows. The access token ID associated with the DataSetFormPrintService scope is "AT_0000004" in the access token ID 1901 of the access token management table 1900. The application module 800 carries out the API call by adding a Base64-encoded """QVRfMDAwMDAwNA==" after ""Authorization: Bearer" of the API call.
GET/oauth2/v1/print?printerid=xxxx&jobid=yyyy HTTP/1.1
Authorization: Bearer QVRfMDAwMDAwNA==
Host: example.com.

In FIG. 12, the application module 800 carries out the stated fourth, fifth, and sixth API calls. These corresponding to the upper level, the middle level, and the lower level in FIG. 12, respectively. In other words, the fourth API call is carried out from step S8.11 to S8.17, the fifth API call is carried out from step S9.11 to S9.17, and the sixth API call is carried out from step S10.11 to S10.17. Aside from the API counting process in the access token verification process shown in the flowchart of FIG. 10, these API call sequences are the same as S1.11 to S1.17 in FIG. 8, and thus descriptions thereof will be omitted. In this manner, services can be received according to individual scopes included in a single group scope by using an access token associated with the group scope.

Figure 13:
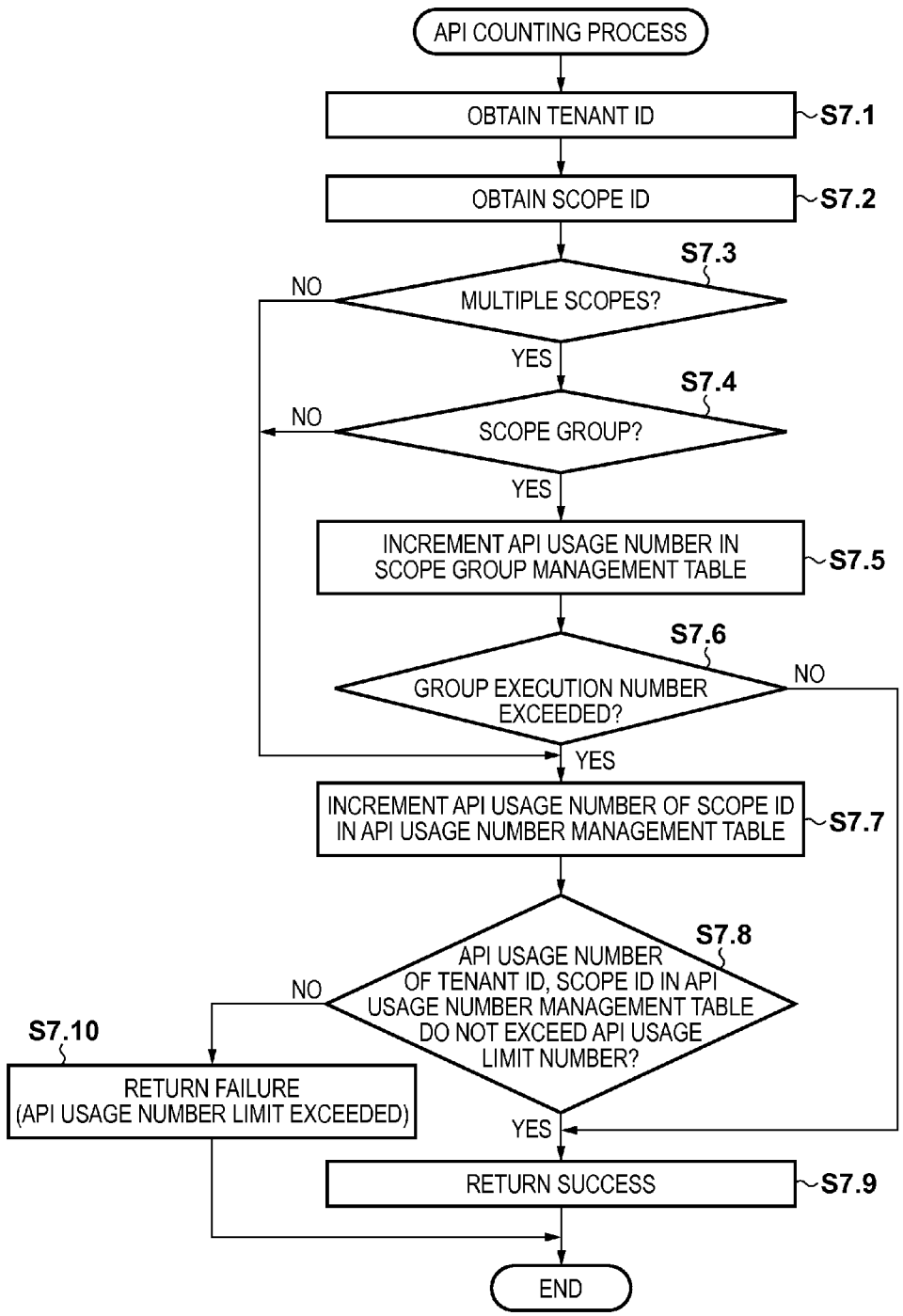
FIG. 13 is a flowchart illustrating an API counting process according to the second embodiment.

The API counting process shown in FIG. 12, performed in the access token verification process shown in the flowchart in FIG. 10, will be described in detail using the flowchart shown in FIG. 13. FIG. 13 illustrates a process executed in the present embodiment in place of FIG. 11 described in the first embodiment.

In step S7.1, the authorization server module 600 obtains a tenant ID associated with the access token to be verified. Specifically, the client ID 1905 of the access token corresponding to the access token ID 1901 in the access token management table 1900 is obtained. Furthermore, a row in the client management table 1300 shown in FIG. 4B corresponding to the client ID is referred to based on the client ID 1301, and the value of the corresponding tenant ID 1303 is obtained. Next, in step S7.2, the authorization server module 600 refers to the access token management table 1900, and refers to the scope ID 1904 in a row matching the current access token ID 1901 to be verified. Next, in step S7.3, it is determined whether the scope ID 1904 referred to in step S7.2 is a single scope ID or multiple scope IDs. Here, if the scope ID indicates multiple scope IDs, the authorization server module 600 refers to a scope ID list 1992 in the scope group table 1990 in step S7.4, and determines whether or not the multiple scope IDs are an exact match with the scope ID list 1992. If, however, the scope ID does not indicate multiple IDs in step S7.3, the process moves to step S7.7. Furthermore, if in step S7.4 the multiple scope IDs do not exactly match the scope ID list 1992, the process moves to step S7.7. If in step S7.4 the multiple scope IDs being verified exactly match the scope ID list 1992, the authorization server module 600 determines that the multiple scope IDs correspond to a scope group ID that matches the scope ID list 1992 in the scope group table 1990.

In the case where the scope group is determined, in step S7.5, the tenant ID 1981 that matches the tenant ID obtained in step S7.1 and the scope ID 1982 that matches the scope group ID are searched out from the scope group API management table 1980, and the API usage number 1984 in the same row is incremented by 1. Here, in step S7.6, the authorization server module 600 determines whether or not the value of the API usage number 1984 in the scope group API management table 1980 exceeds the value of the group execution number 1983. If the value of the API usage number 1984 exceeds the value of the group execution number 1983, the authorization server module 600 returns the value of the API usage number 1984 to 0 and then moves to step S7.7. However, if the value of the API usage number 1984 does not exceed the value of the group execution number 1983, the authorization server module 600 returns "success" in S7.9, after which the process ends. In step S7.7, the authorization server module 600 confirms the value of the API usage limit number 1954 in the column of the API usage number management table 1950 referred to earlier, and compares the API usage number 1955 to the API usage limit number 1954. If the API usage number 1955 has not exceeded the API usage limit number 1954 in step S7.8, it is determined that the API usage is within the API usage number limit, "success" is returned in step S7.9, and the process ends. However, if the API usage number 1955 has exceeded the API usage limit number 1954 in step S7.8, it is determined that the API usage has exceeded the API usage number limit, "failure" is returned in step S7.10, and the process ends.

The foregoing has described API usage number limit management by scope and by scope group according to the second embodiment. Through this processing, the authorization server module 600 can receive, from a client, a request for a scope used when registering the client, and can return a registration error at that point in time if there is insufficient authority. This makes it possible to avoid wasteful client registration.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-268093, filed Dec. 25, 2013, which is hereby incorporated by reference herein in its entirety.

What is claimed is:

1. An authority management server that is connected with a client, the authority management server comprising one or more hardware processors configured to function as:
   a management unit that manages an access limit number of a number of accesses to a resource, the access limit number being assigned to each of a plurality of tenants;
   an issuing unit that, in response to an authorization request from a client which belongs to a tenant and requests delegation of a user's access authority for a resource, verifies the authorization request, issues an access token, and transmits the access token to the client in the case where the verification of the authorization request is successful; and
   a verification unit that, in the case where a resource request is transmitted from the client along with the access token, verifies the access token and transmits a verification response to the client in the case where the verification of the access token is successful,
   wherein at both timings of the authorization request verification performed by the issuing unit and the access token verification performed by the verification unit, the server determines whether or not a number of accesses to the resource has exceeded the access limit number set for the tenant, and in a case where the number of accesses has not exceeded the access limit number, issues and transmits the access token by the issuing unit when the verification of the authorization request is successful or transmits the verification response by the verification unit when the verification of the access token is successful.

2. The authority management server according to claim 1, wherein whether or not the number of accesses to the resource exceeds the access limit number is determined by comparing the number of accesses to each resource to an access limit number set for each resource.

3. The authority management server according to claim 1, wherein the access limit number is an access limit number for each tenant to which the resource is to be provided and for each unit period.

4. The authority management server according to claim 1, wherein the one or more hardware processors are further configured to function as a setting unit that displays an input screen for inputting the access limit number in a terminal and setting a value input through the input screen as the access limit number.

5. The authority management server according to claim 4, wherein an input field for inputting the access limit number on a resource-by-resource basis is included in the input screen, and the values input in the input screen on a resource-by-resource basis are set as the access limit numbers on a resource-by-resource basis.

6. The authority management server according to claim 1, wherein a group configured of a plurality of resources can be included in both the authorization request and the access token, and
wherein whether or not the number of accesses to the resource exceeds the access limit number is determined by comparing the number of accesses to each resource at a group level to an access limit number set for each group.

7. The authority management server according to claim 6, wherein the one or more hardware processors are further configured to function as a setting unit that displays an input screen for inputting the access limit number in a terminal and setting a value input through the input screen as the access limit number,
wherein an input field for inputting the access limit number on a group-by-group basis is included in the input screen, and the values input in the input screen on a group-by-group basis are set as the access limit numbers.

8. The authority management server according to claim 1, wherein in the case where the access token verification has resulted in the access token being verified as authentic, the resource is allowed to be accessed without requesting credentials to be input.

9. A resource providing system comprising:
an authority management server that is connected with a client;
a terminal connected to the authority management server; and
a resource server that, in the case where a resource request has been received from the terminal along with an access token, requests the authority management server to verify the access token, and in the case where a response accepting the access token has been received from the authority management server, provides the resource requested by the terminal,
wherein the authority management server comprises one or more processors to function as:
a management unit that manages an access limit number of a number of accesses to a resource, the access limit number being assigned to each of a plurality of tenants;
an issuing unit that, in response to an authorization request from a client which belongs to a tenant and requests delegation of a user's access authority for a resource, verifies the authorization request, issues an access token, and transmits the access token to the client in the case where the verification of the authorization request is successful; and
a verification unit that, in the case where a resource request is transmitted from the client along with the access token, verifies the access token and transmits a verification response to the client in the case where the verification of the access token is successful,
wherein at both timings of the authorization request verification performed by the issuing unit and the access token verification performed by the verification unit, the server determines whether or not a number of accesses to the resource has exceeded the access limit number set for the tenant, and in a case where the number of accesses has not exceeded the access limit number, issues and transmits the access token by the issuing unit when the verification of the authorization request is successful or transmits the verification response by the verification unit when the verification of the access token is successful.

10. A non-transitory computer-readable medium storing a program therein for causing a computer to perform a method, the method comprising:
managing an access limit number of a number of accesses to a resource, the access limit number being assigned to each of a plurality of tenants;
verifying, in response to an authorization request from a client which belongs to a tenant and requests delegation of a user's access authority for a resource, the authorization request, issuing an access token, and transmitting the access token to the client in the case where the verification of the authorization request is successful; and
in the case where a resource request is transmitted from the client along with the access token, verifying the access token and transmitting a verification response to the client in the case where the verification of the access token is successful,
wherein at both timings of the authorization request verification performed in the issuing and the access token verification performed in the verifying, it is determined whether or not a number of accesses to the resource has exceeded the access limit number set for the tenant, and in a case where the number of accesses has not exceeded the access limit number, the access token is issued in the issuing and is transmitted in the transmitting when the verification of the authorization request is successful or a verification response is transmitted in the verifying when the verification of the access token is successful.

11. An authority management method comprising:
managing an access limit number of a number of accesses to a resource, the access limit number being assigned to each of a plurality of tenants;
verifying, in response to an authorization request from a client which belongs to a tenant and requests delegation of a user's access authority for a resource, the authorization request, issuing an access token, and transmitting the access token to the client in the case where the verification of the authorization request is successful; and
in the case where a resource request is transmitted from the client along with the access token, verifying the access token and transmitting a verification response to the client in the case where the verification of the access token is successful,
wherein at both timings of the authorization request verification performed in the issuing and the access token verification performed in the verifying, it is determined whether or not a number of accesses to the resource has exceeded the access limit number set for the tenant, and in a case where the number of accesses has not exceeded the access limit number, the access token is issued in the issuing and is transmitted in the transmitting when the verification of the authorization request is successful or a verification response is transmitted in the verifying when the verification of the access token is successful.

* * * * *